(12) United States Patent
Ono et al.

(10) Patent No.: US 8,716,362 B2
(45) Date of Patent: May 6, 2014

(54) ULTRAVIOLET-CURABLE SILICONE RESIN COMPOSITION, AND IMAGE DISPLAY DEVICE USING THE SAME

(75) Inventors: Kazuhisa Ono, Tokyo (JP); Koji Okawa, Tokyo (JP)

(73) Assignee: Momentive Performance Materials Japan LLC, Tokyo (JP)

( * ) Notice: Subject to any disclaimer, the term of this patent is extended or adjusted under 35 U.S.C. 154(b) by 0 days.

(21) Appl. No.: 13/700,523

(22) PCT Filed: Dec. 6, 2011

(86) PCT No.: PCT/JP2011/078144
§ 371 (c)(1),
(2), (4) Date: Nov. 28, 2012

(87) PCT Pub. No.: WO2012/086402
PCT Pub. Date: Jun. 28, 2012

(65) Prior Publication Data
US 2013/0065983 A1    Mar. 14, 2013

(30) Foreign Application Priority Data

Dec. 22, 2010 (JP) ................................. 2010-286453

(51) Int. Cl.
    C03C 25/10    (2006.01)
    C08F 2/46     (2006.01)
    C08G 61/04    (2006.01)

(52) U.S. Cl.
    USPC .................................. 522/172; 522/1; 520/1

(58) Field of Classification Search
    USPC .......................................... 522/172, 1; 520/1
    See application file for complete search history.

(56) References Cited

U.S. PATENT DOCUMENTS

| | | | |
|---|---|---|---|
| 4,935,455 A | 6/1990 | Huy et al. | |
| 5,432,280 A | 7/1995 | Hara et al. | |
| 5,548,038 A | 8/1996 | Enami et al. | |
| 2007/0275255 A1* | 11/2007 | Ooms et al. | 428/447 |
| 2009/0296033 A1 | 12/2009 | Shinya et al. | |
| 2010/0301377 A1* | 12/2010 | Kato et al. | 257/100 |

FOREIGN PATENT DOCUMENTS

| | | |
|---|---|---|
| EP | 0 769 528 A2 | 4/1997 |
| JP | 63-72775 A | 4/1988 |
| JP | 1-286939 A | 11/1989 |
| JP | 2-151660 A | 6/1990 |
| JP | 2-245060 A | 9/1990 |
| JP | 3-64389 A | 3/1991 |
| JP | 3-064389 A | 3/1991 |
| JP | 3-74463 A | 3/1991 |
| JP | 6-107947 A | 4/1994 |
| JP | 7-134538 A | 5/1995 |
| JP | 7-268219 A | 10/1995 |
| JP | 8-157729 A | 6/1996 |
| JP | 9-169908 A | 6/1997 |
| JP | 2004-117831 A | 4/2004 |
| JP | 2005-171189 * | 6/2005 |
| JP | 2005-171189 A | 6/2005 |
| JP | 2006-52331 A | 2/2006 |
| JP | 2008-150439 A | 7/2008 |
| JP | 2008-280368 A | 11/2008 |
| JP | 2008-282000 A | 11/2008 |

OTHER PUBLICATIONS

International Search Report for PCT/JP2011/078144 mailed Feb. 14, 2012.
U.S. Appl. No. 13/700,573.
English-language International Preliminary Report on Patentability and Written opinion of the International Searching Authority, dated Jul. 11, 2013 for International Application PCT/JP2011/078144 filed Dec. 8, 2011; Applicants: Momentive Performance Materials Japan LLC.

\* cited by examiner

*Primary Examiner* — Ling Choi
*Assistant Examiner* — Jessica E Whiteley
(74) *Attorney, Agent, or Firm* — Holtz Holtz Goodman & Chick PC

(57) ABSTRACT

An ultraviolet-curable silicone resin composition including (A) a polyorganosiloxane having a mercaptoalkyl bonded to a silicon atom and having a viscosity at 23° C. of 20 to 25000 cP; (B) an organopolysiloxane having aliphatic unsaturated groups which includes (B1) a linear polyorganosiloxane having aliphatic unsaturated, and (B2) a branched organopolysiloxane which includes an $SiO_{4/2}$ unit, an $R'_3SiO_{1/2}$ unit and an $R'_2SiO_{2/2}$ unit, and at least three of R' per one molecule are aliphatic unsaturated groups, provided that an amount of (B2) is an amount where a number of the aliphatic unsaturated groups in (B2) based on a total number of the aliphatic unsaturated groups in (B) is 50% or less; (C) a photoinitiator; and (D) a silane compound having an aliphatic unsaturated group.

11 Claims, 1 Drawing Sheet

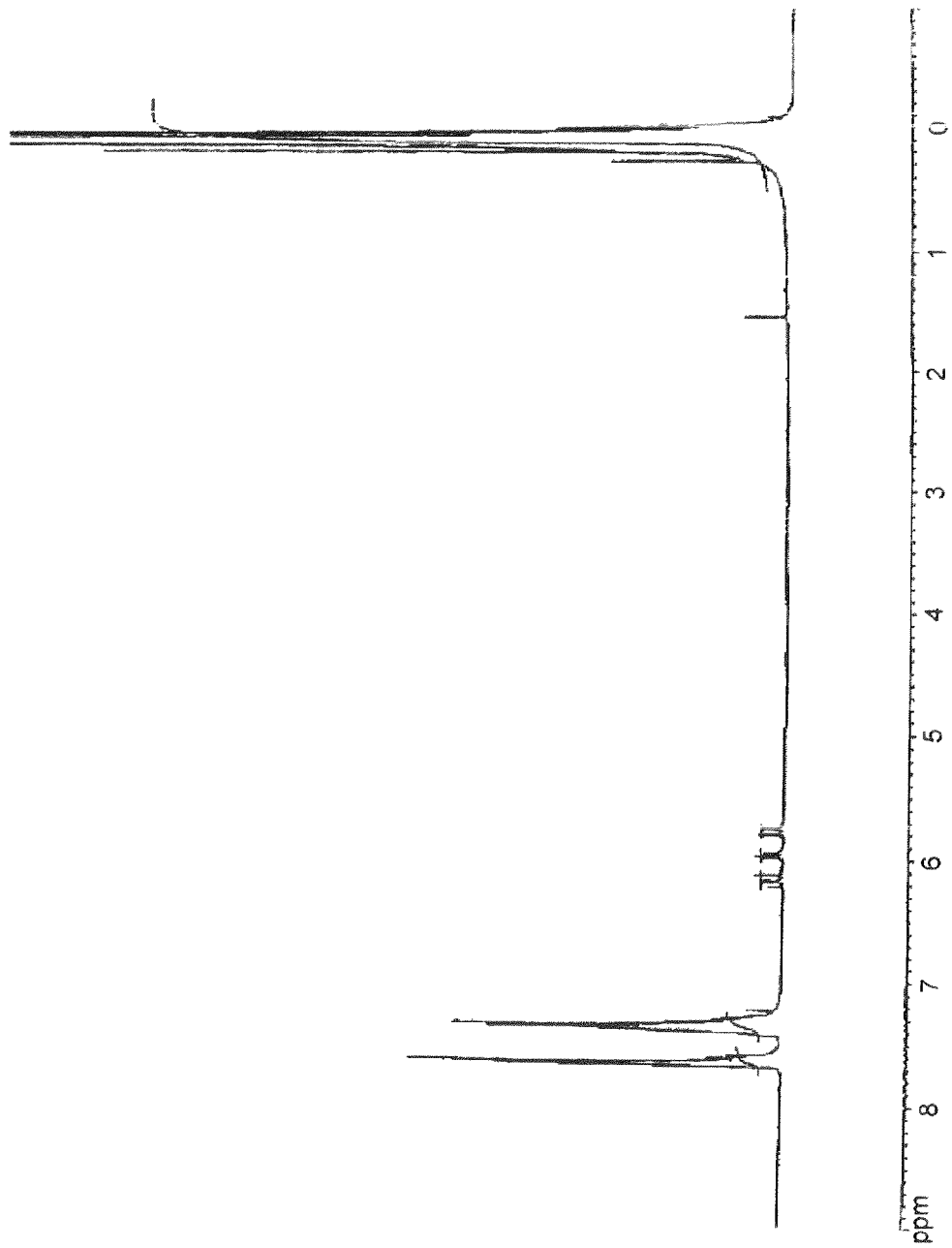

ULTRAVIOLET-CURABLE SILICONE RESIN COMPOSITION, AND IMAGE DISPLAY DEVICE USING THE SAME

CROSS-REFERENCE TO RELATED APPLICATION

This application is a United States national phase application of International Application PCT/JP2011/078144 filed Dec. 6, 2011.

TECHNICAL FIELD

The present invention relates to an ultraviolet-curable silicone resin composition which can be suitably used for an image display device, and an image display device using the same.

BACKGROUND ART

In recent years, a flat panel type image display device such as a liquid crystal, plasma, organic EL, etc. has been attracted attention. The flat panel type image display device has a display area (an image display portion) in which a number of picture elements comprising a semiconductor layer or a fluorescent layer which constitutes an active element, or a light-emitting layer are provided in a matrix state between a pair of the substrates at least one of which has optical transparency such as a glass. In general, and has been constituted by encapsulating the surroundings of the display area (an image display portion) and a protective portion formed by a glass or an optical plastic such as an acrylic resin are extremely closely encapsulated by an adhesive.

In such an image display device, a thin type image display device in which an ultraviolet-curable resin composition had been interposed between a protective portion and an image display portion to prevent from lowering in legibility (visibility) due to reflection of outdoor natural light or indoor lighting has been prepared, and as the ultraviolet-curable resin composition herein used, an ultraviolet-curable acrylic resin or a ultraviolet-curable silicone resin composition has been used (Patent Literatures 1 and 2).

On the other hand, it has been proposed an ultraviolet-curable silicone resin composition comprising a polyorganosiloxane having a mercaptoalkyl group and a polyorganosiloxane having an aliphatic unsaturated group (Patent Literatures 3 and 4).

PRIOR ART LITERATURES

Patent Literatures

[Patent Literature 1] JP 2008-282000A
[Patent Literature 2] JP H07-134538A
[Patent Literature 3] JP H02-245060A
[Patent Literature 4] JP H03-064389A

DISCLOSURE OF THE INVENTION

Problems to be Solved by the Invention

For preparing the above-mentioned thin type image display device in which an ultraviolet-curable resin composition is interposed between the protective portion and the image display portion, due to internal stress by the shrinkage at the time of curing the conventional ultraviolet-curable acrylic resin composition or ultraviolet curable silicone resin composition, deformation occurs at an image display portion (for example, liquid crystal display panel), whereby display failure sometimes occurs caused by disorder of orientation of the liquid crystal material, etc. This display failure becomes a cause of preventing from display with good and high brightness and high contrast high contrast. Also, the problem of display failure by display unevenness caused by an outer stress applied to the image display portion due to warpage of the protective portion caused by shrinkage thereof at the time of curing is becoming further apparent in recent years where the image display device is required to have high brightness and high fineness with a large sized.

Further, the ultraviolet-curable silicone resin compositions disclosed in Patent Literatures 3 and 4 cannot comply with the above-mentioned problems of display failure, since a thin-type image display device as used in the present time was not present.

An object of the present invention is, for producing a thin type or large sized image display device wherein a resin is interposed between a protective portion and an image display portion, to provide an ultraviolet-curable silicone resin composition which is a liquid state and excellent in coating property, without causing display failure caused by deformation of the image display portion (hereinafter also referred to as deforming resistance), without lowering legibility, capable of realizing display with high brightness and high contrast, and an image display device using the same.

Means to Solve the Problems

The present invention 1 relates to an ultraviolet-curable silicone resin composition which comprises
(A) a polyorganosiloxane containing a mercaptoalkyl group bonded to a silicon atom, and having a viscosity at 23° C. of 20 to 25000 cP;
(B) an organopolysiloxane having aliphatic unsaturated groups which comprises
(B1) a linear polyorganosiloxane having an aliphatic unsaturated group represented by the formula (I):

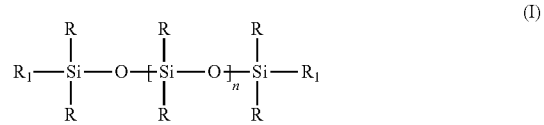

wherein
each $R_1$ independently represents an aliphatic unsaturated group,
each R independently represents a C1-C6 alkyl group or C6-C12 aryl group, and among Rs, 1 to 60% is a C6-C12 aryl group.
n is a number which makes a viscosity at 23° C. 100 to 25000 cP, and (B2) a branched organopolysiloxane which comprises an $SiO_{4/2}$ unit, an $R'_3SiO_{1/2}$ unit and an $R'_2SiO_{2/2}$ unit, and further optionally an $R'SiO_{3/2}$ unit, wherein each R' independently represents a C1-C6 alkyl group or aliphatic unsaturated group, at least three of R' per one molecule are aliphatic unsaturated groups, provided that an amount of (B2) is made an amount where a number of the aliphatic unsaturated group in (B2) based on a total number of the aliphatic unsaturated groups in (B) is 50% or less;
(C) a photoinitiator; and
(D) a silane compound containing an aliphatic unsaturated group, where a ratio of a number of the mercaptoalkyl group in (A) based on a total number of the aliphatic unsaturated groups in (B) and (D) is 0.5 to 1.05, a ratio of a number of the mercaptoalkyl group in (A) based on a number of the aliphatic unsaturated group in (B) is 0.95 to 3, and a ratio of a number of the mercaptoalkyl group in (A) based on number of the aliphatic unsaturated group in (D) is 1.5 to 3.

The present invention 2 relates to the ultraviolet-curable silicone resin composition of the present invention 1, wherein the content of (C) is 0.05 to 50 parts by weight based on 100 parts by weight of (B).

The present invention 3 relates to the ultraviolet-curable silicone resin composition of the present invention 1 or 2, which further comprises one or more silicone resin series adhesion improver selected from the group consisting of (E) a MQ resin, a MDQ resin, a MT resin, a MDT resin, a MDTQ resin, a DQ resin, a DTQ resin and a TQ resin.

The present invention 4 relates to the ultraviolet-curable silicone resin composition of any one of the present inventions 1 to 3, wherein (D) is one or more silane compound having an aliphatic unsaturated group selected from the group consisting of 3-methacryloxypropyltriethoxysilane, 3-methacryloxypropyltrimethoxysilane, vinyltrimethoxysilane and vinyltriethoxysilane.

The present invention 5 relates to the ultraviolet-curable silicone resin composition of any one of the present inventions 1 to 4, wherein visible light transmittance after curing is 95% or more.

The present invention 6 relates to the ultraviolet-curable silicone resin composition of any one of the present inventions 1 to 5, wherein cure shrinkage is 1.0% or less.

The present invention 7 relates to the ultraviolet-curable silicone resin composition of any one of the present inventions 1 to 6, wherein a E hardness after curing is 5 to 40.

The present invention relates to the ultraviolet-curable silicone resin composition of any one of the present inventions 1 to 7, wherein a ratio (G'(T)/G'(23)) of a storage modulus G'(T) in the temperature range of −50° C. to 100° C. to a storage modulus G'(23) at 23° C. after curing is 0.1 to 30.

The present invention 9 relates to the ultraviolet-curable silicone resin composition of any one of the present inventions 1 to 8, wherein a ratio (G"(T)/G"(23)) of a loss modulus G"(T) in the temperature range of −50° C. to 100° C. to a loss modulus G"(23) at 23° C. after curing is 0.1 to 300.

Also, the present invention 10 relates to a sealing agent for an image display device comprising the ultraviolet-curable silicone resin composition of any one of the present inventions 1 to 9, Moreover, the present invention 11 relates to an image display device which comprises an image display portion and a protective portion which are encapsulated by using the sealing agent for an image display device according to the present invention 10, Effects of the Invention According to the present invention, for producing a thin type or large sized image display device in which a resin is interposed between a protective portion and an image display portion, it can be provided an ultraviolet-curable silicone resin composition which is a liquid state, excellent in coating property, without causing display failure caused by deformation of the image display portion, and without lowering legibility, and capable of realizing display with high brightness and high contrast.

BRIEF DESCRIPTION OF THE DRAWING

FIG. 1 is a chart showing the result of an NMR measurement of a vinyl-terminated polymethylphenylsiloxane of (b-2) in Example.

BEST MODE TO CARRY OUT THE INVENTION

The ultraviolet-curable silicone resin composition of the present invention contains (A) a polyorganosiloxane having a mercaptoalkyl group bonded to a silicon atom and having a viscosity at 23° C. of 20 to 25000 cP, (B) an organopolysiloxane having an aliphatic unsaturated group which comprises (B1) a linear polyorganosiloxane having an aliphatic unsaturated group represented by the formula (I):

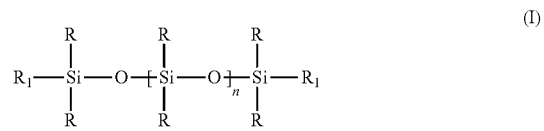

wherein each $R_1$ independently represents an aliphatic unsaturated group, each R independently represents a C1-C6 alkyl group or C6-C12 aryl group; and among Rs, 1 to 60 mol % is a C6-C12 aryl group, n is a number which makes a viscosity at 23° C. 100 to 25000 cP, and, (B2) a branched organopolysiloxane having an R'SiO$_{3/2}$ unit, an R'$_3$SiO$_{1/2}$ unit and an R'$_2$SiO$_{2/2}$ unit, and further optionally an R'SiO$_{3/2}$ unit, wherein each R' independently represents a C1-C6 alkyl group or aliphatic unsaturated group, and at least three of R' per one molecule are aliphatic unsaturated groups, provided that an amount of (B2) is an amount where a number of the aliphatic unsaturated group in (B2) based on a total number of the aliphatic unsaturated groups in (B) is 50% or less;

(C) a photoinitiator; and (D) a silane compound containing an aliphatic unsaturated group.

The composition of the present invention contains (A) a polyorganosiloxane having a mercaptoalkyl group bonded to a silicon atom, and having a viscosity at 23° C. of 20 to 25000 cP.

In (A), a number of the mercaptoalkyl groups bonded to a silicon atom in one molecule can be made 2 or more and 20 or less in average in the viewpoints of suppressing excessive curing shrinkage while ensuring stable structure due to the cross-linking reaction. Of these, it is preferably more than 2 and 10 or less, more preferably 3 to 7.

In (A), the alkyl portion of the mercaptoalkyl group bonded to the silicon atom can be a C1-C6 alkyl group. The mercaptoalkyl group may be mentioned mercaptomethyl, 2-mercaptoethyl, 3-mercaptopropyl, 4-mercaptobutyl, 6-mercaptohexyl, etc., and mercaptomethyl and 3-mercaptopropyl are preferred in the point of easily synthesized, etc., more preferably 3-mercaptopropyl.

In (A), organic groups other than the mercaptoalkyl group bonded to the silicon atom can be a substituted or unsubstituted monovalent hydrocarbon group (provided that it is not an aliphatic unsaturated group). More specifically, there may be mentioned an alkyl group such as a C1-C6 alkyl group (for example, methyl, ethyl, propyl, etc.); a cyclo alkyl group such as a C3-C10 cyclo alkyl group (for example, cyclohexyl, etc.); an aryl group such as a C6-C12 aryl (for example, phenyl, tolyl, xylyl, etc.); an aralkyl group such as a C7-C13 aralkyl group (for example, 2-phenylethyl. 2-phenylpropyl, etc.); and a substituted hydrocarbon group such as a halogen-substituted hydrocarbon group (for example, chloromethyl, chlorophenyl, 3,3,3-trifluoropropyl, etc.). In the point of easily synthesized, etc., an alkyl group is preferred, and among these, methyl, ethyl and propyl are preferred, more preferably methyl. An aryl group can be used in combination to adjust a refractive index, and among these, phenyl is preferred in the point of easily synthesized, etc.

The structure of the main chain of (A) may be either a linear, a branched or a cyclic, and a branched one is preferred. For example, there may be mentioned a branched organopolysiloxane having mercaptoalkyl groups which comprises an $R''SiO_{3/2}$ unit, an $R''_3SiO_{1/2}$ unit and an $R''_2SiO_{2/2}$ unit, and, in some cases, further an $SiO_{4/2}$ unit, wherein R"s each independently represent a unsubstituted or substituted monovalent hydrocarbon group, provided that it is not an aliphatic unsaturated group, and 2 or more and 20 or less R"s are mercaptoalkyl groups per one molecule. The mercaptoalkyl group and the unsubstituted or substituted monovalent hydrocarbon group may be mentioned the above-mentioned groups. R" which is a mercaptoalkyl group may be present as R" of any unit, and preferably it is present as R" of the $R''SiO_{3/2}$ unit. The mercaptoalkyl group and the unsubstituted or substituted monovalent hydrocarbon group may be mentioned the above-mentioned groups. In the viewpoints of workability and cross-linking reactivity, a ratio of a number of the siloxane unit having a mercaptoalkyl group and a number of the siloxane unit containing no mercaptoalkyl group is preferably 1:60 to 1:25, but the invention is not limited by the ratio.

Regarding (A), the viscosity at 23° C. is 20 to 25000 cP. The viscosity can be made, for example, 30 to 23000 cP in the viewpoints of workability and refractive index. In the point of workability, it is preferably a low viscosity, and the viscosity at 23° C. can be made, for example, 20 to 2000 cP, more preferably 50 to 500 cP, In the present specification, the viscosity is a value measured by using a rotational viscometer (Vismetron VDA-L) (manufactured by Shibaura System Co., Ltd.) and a rotor No. 2 to 4 and measured at 30 to 60 rpm at 23° C.

A number of the mercapto groups in (A) eau be measured by the colorimetric titration using iodine. This is a method utilizing the reaction of the following formula:

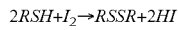

$2RSH + I_2 \rightarrow RSSR + 2HI$

, and utilizes that the titration solution becomes pale yellow with a minute amount of excessive iodine during the titration.

(A) is preferably a material having high transparency. As an index of the transparency, there may be mentioned when (A) is filled in an apparatus at 23° C. with a thickness of 10 mm, and a transmittance at a wavelength of the visible ray region (360 to 780 nm) is measured by a spectrophotometer, then, the transmittance is 80% or more. The transmittance is preferably 90% or more since transparency of the cured product of the composition of the present invention can be maintained stably.

Preparation method of (A) is not particularly limited, and it can be prepared by, for example, subjecting an alkylchlorosilane or a mercaptoalkylalkoxysilane such as mercaptopropyltrimethoxysilane, mercaptopropyltriethoxysilane, mercaptopropyl-methyldimethoxysilane, metcaptopropylmethyldiethoxysilane, mercaptopropyl-dimethylmethoxysilane, mercaptopropyldimethylethoxysilane, etc., and a desired alkylchlorosilane, alkylalkoxysilane or silanol-containing siloxane to hydrolysis, polycondensation or re-equilibration, (A) may be used alone, or in combination.

The composition of the present invention comprises (B) an organopolysiloxane having an aliphatic unsaturated group which comprises (B1) a linear polyorganosiloxane containing an aliphatic unsaturated group represented by the formula (I):

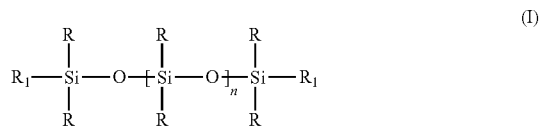

wherein each $R_1$ independently represents an aliphatic unsaturated group, each R independently represents a C1-C6 alkyl group or C6-C12 aryl group, and among Rs, 1 to 60 mol % is a C6-C12 aryl group, n is the number which makes the viscosity at 23° C. 100 to 25000 cP, and (B2) a branched organopolysiloxane comprising an $SiO_{4/2}$ unit, an $R'_3SiO_{1/2}$ unit and an $R'_2SiO_{2/2}$ unit, and, in some cases, further comprising an $R'SiO_{3/2}$ unit, wherein each R' independently represents a C1-C6 alkyl group or aliphatic unsaturated group, and at least three of R' per one molecule are aliphatic unsaturated groups, provided that an amount of (B2) is an amount where a number of the aliphatic unsaturated group in (B2) based on a total number of the aliphatic unsaturated groups in (B) is 50% or less.

In (B), (B2) is an optional component, and a ratio of a number of the aliphatic unsaturated groups in (B2) based on the total number of the aliphatic unsaturated groups in (B) can be made an amount of 50% or less, preferably an amount of 30% or less. By using (B2) in combination, an E hardness of the cured product can be controlled. En the point of efficiently adjusting E hardness, it is preferably made an amount of 8% or more, more preferably an amount of 10% or more. Also, by using (B2) in combination, adhesiveness can be also improved, in particular, when the material to be adhered is a polarizing plate, high improving effect can be expected.

In the formula (I) with respect to (B1), $R^1$ is an aliphatic unsaturated group. $R^1$ at the both ends may be the same or different from each other, and preferably the same with each other.

The aliphatic unsaturated group may be mentioned an alkenyl group, for example, a C2-C6 alkenyl group (for example, vinyl, propenyl, butenyl, hexenyl, etc.). An alkenyl group the terminal of which is an unsaturated is more preferred, and a vinyl group is preferred in the point of easily synthesized, etc.

In the formula (I), R is a C1-C6 alkyl group (for example, methyl, ethyl, propyl, etc.) or a C6-C12 aryl group (for example, phenyl, tolyl, xylyl, etc.). R may be the same or different from each other.

Among Rs, 1 to 60 mol % thereof is a C6-C12 aryl group in the point of adjustment of the refractive index, and among Rs, 1 to 50 mol % thereof is preferably a C6-C12 aryl group in the viewpoints of viscosity and thixotropic properties, it is more preferably 1 to 35 mol %.

The C1-C6 alkyl group is preferably methyl, and the C6-C12 aryl group is preferably phenyl in the point of easily synthesized, etc.

In the formula (I), as (B1), preferred are those in which 1 to 60 mol % of Rs is a phenyl group, and the remainder is a methyl group, more preferred are those in which 1 to 50 mol % of Rs is a phenyl group, and the remainder is a methyl group, further preferred are those in which 1 to 35 mol % of Rs is a phenyl group, and the remainder is a methyl group, (B1) has a viscosity at 23° C. of 100 to 25000 cP in the viewpoint of workability of the composition, more preferably 200 to 10000 cP, further preferably 300 to 5000 cP, A number of the aliphatic unsaturated group(s) in (B1) can be obtained by obtaining an average structural formula using NMR, calculating the molecular weight, and obtaining the number from the resulting molecular weight.

A preparation method of (B1) is not particularly limited, and can be obtained, for example, by subjecting chlorosilanes such as dimethyldichlorosilane, diphenyldichlorosilane, methylphenyldichlorosilane, dimethylvinylchlorosilane, etc., which are necessary for the desired structure to polycondensation or re-equilibration, or subjecting alkoxysilanes such as dimethyldimethoxysilane, diphenyldimethoxysilane, methylphenyldimethoxysilane, dimethylvinylmethoxy, etc., which are necessary for the desired structure to co-hydrolysis, polycondensation or re-equilibration. Also, it can be obtained by subjecting siloxanes such as 1,1,3,3,5,5,7,7-octamethylcyclotetrasiloxane, 1,1,3,3,5,7,7-octaphenylcyclotetrasiloxane, 1,1,3,3-tetramethyl-1,3-divinyldisiloxane, etc., which are necessary for the desired structure to ring-opening polymerization, re-equilibration, in the presence of an alkali catalyst (am alkali metal hydroxide salt, an alkali metal silanolate, an ammonium hydroxide salt, etc.) or an acid catalyst (sulfuric acid, silanolate sulfate, trifluoromethanesulfonic acid).

(B1) may be used alone, or in combination.

(B2) is a branched organopolysiloxane comprising an $SiO_{4/2}$ unit, an $R'_3SiO_{1/2}$ unit and an $R'_2SiO_{2/2}$ unit, and, in some cases, further comprises an $R'SiO_{3/2}$ unit, wherein each R' independently represents a C1-C6 alkyl group or aliphatic unsaturated group, and at least three R's are aliphatic unsaturated groups per one molecule.

(B2) may be mentioned a branched organopolysiloxane which possesses the $SiO_{4/2}$ unit with a ratio of 6 to 10 mol and the $R'_3SiO_{1/2}$ unit of 4 to 8 mol based on 1 mol of the $R'_2SiO_{2/2}$ unit. (B2) is preferably a resinous or liquid state material where it is a solid or viscous semi-solid at normal temperature. For example, those having a weight average molecular weight of 1,000 to 400,000 may be mentioned, preferably those having 2,000 to 200,000. The weight average molecular weight is a value measured by gel permeation chromatograph analysis (GPC) using a polystyrene as a calibration curve.

The aliphatic unsaturated group with respect to R' may be mentioned the groups mentioned as the aliphatic unsaturated group (B1), specifically mentioned an alkenyl group, for example, a C2-C6 alkenyl group (for example, vinyl, propenyl, butenyl, hexenyl, etc.). An alkenyl group the terminal of which is unsaturated is more preferred, and a vinyl group is preferred in the point of easily synthesized, etc R' which is an aliphatic unsaturated group may be present as R' of any unit, and preferably it is present as R' of the $R'_2SiO$ unit.

R' other than the aliphatic unsaturated group is a C1-C6 alkyl group (for example, methyl, ethyl, propyl, etc.), and a methyl group is preferred in consideration of heat resistance.

When (B2) is to be used, it may be used alone, or in combination of two or more.

The composition of the present invention contains (C) a photoinitiator. (C) is a component which acts as a radical initiator for photocrosslinking (A) and (B), or a sensitizer. (C) may be mentioned an aromatic hydrocarbon, acetophenone and a derivative thereof, benzophenone and a derivative thereof, o-benzoylbenzoic acid ester, benzoin and benzoin ether and a derivative thereof, xanthone and a derivative thereof, a disulfide compound, a quinone compound, a halogenated hydrocarbon and amine, and an organic peroxide in the viewpoint of reactivity. A compound having a substituted or unsubstituted benzoyl group or an organic peroxide is more preferred in the viewpoints of compatibility with the silicone and stability.

(C) may be mentioned, for example, acetophenone, propiophenone, 2-hydroxy-2-methylpropiophenone, 2,2-dimethoxy-1,2-diphenylethan-1-one (IRGACURE 651: available from BASF AG), 2-hydroxy-2-methyl-1-phenyl-propan-1-one (DAROCUR 1173: available from BASF AG), 1-hydroxy-cyclohexyl-phenyl-ketone (IRGACURE 184: available from BASF AG), 1-[4-(2-hydroxyethoxy)-phenyl]-2-hydroxy-2-methyl-1-propan-1-one (IRGACURE 2959: available from BASF AG), 2-hydroxy-1-{4-[4-(2-hydroxy-2-methyl-propionyl)-benzyl]phenyl}-2-methyl-propan-1-one (IRGACURE 127: available from BASF AG), 2-methyl-1-(4-methylthiophenyl)-2-morpholinopropan-1-one (IRGACURE 907: available from BASF AG), 2-benzyl-2-dimethylamino-(4-morpholinophenyl)-butanone-1 (IRGACURE 369: available from BASF AG), 2-(dimethylamino)-2-[(4-methylphenyl)methyl]-1-[4-(4-morpholinyl)phenyl]-1-butanone (IRGACURE 379: available from BASF AG); 2,4,6-trimethylbenzoyl-diphenyl-phosphonoxide (LUCIRIN TPO: available from BASF AG), bis(2,4,6-trimethylbenzoyl)-phenylphosphonoxide (IRGACURE 819: available from BASF AG); 1,2-octanedione, 1-[4-(phenylthio)-,2-(O-benzoyloxime)] (IRGACURE OXE 01: available from BASF AG), ethanone, 1-[9-ethyl-6-(2-methylbenzoyl)-9H-carbazol-3-yl]-,1-(O-acetyloxime) (IRGACURE OXE 02: available from BASF AG); oxyphenylacetic acid, 2-[2-oxo-2-phenylacetoxyethoxy]ethylester and oxyphenylacetic acid, a mixture of 2-(2-hydroxyethoxy)ethyl esters (IRGACURE 754: available from BASF AG), phenylglyoxylic acid methyl ester (DAROCUR MBF: available from BASF AG), ethyl-4-dimethylaminobenzoate (DAROCUR EDB: available from BASF AG), 2-ethylhexyl-4-dimethylaminobenzoate (DAROCUR EHA: available from BASF AG), bis(2,6-dimethoxybenzoyl)-2,4,4-trimethyl-pentylphosphonoxide (CGI 403: available from BASE AG), benzoylperoxide, cumen peroxide, etc.

(C) may be used alone, or in combination of two or more.

The composition of the present invention contains (D) a silane compound having an aliphatic unsaturated group. (D) has a role of improving adherence or adhesiveness to the substrate of the cured product. The aliphatic unsaturated group may be mentioned the groups which are mentioned as the aliphatic unsaturated group in (B1), more specifically an alkenyl group, for example, a C2-C6 alkenyl group (for example, vinyl, propenyl, butenyl, hexenyl, etc.) may be mentioned. An alkenyl group a terminal of which is unsaturated is more preferred, and a vinyl group is preferred in the point of easily synthesized, etc.

(D) may be mentioned 3-methacryloxypropyltriethoxysilane. 3-methacryloxypropyltrimethoxysilane, vinyltrimethoxysilane and vinyltriethoxysilane, preferably 3-methacryloxypropyltriethoxysilane or 3-methacryloxypropyltrimethoxysilane.

(D) may be used alone, or in combination of two or more.

When a number of the mercaptoalkyl groups bonded to a silicon atom in (A) is defined to be HS, a number of the aliphatic unsaturated groups in (B) ViB, and a number of the aliphatic unsaturated groups in (D) ViD, then, a ratio of HS based on ViB+ViD (HS/(ViB+ViD)) is 0.5 to 1.05 in the viewpoints of imparting a suitable hardness and elasticity to the cured product, preferably 0.55 to 1.0, and further preferably 0.6 to 0.9. When (B1) alone is used as (B), a number of the aliphatic unsaturated groups in (B) equals to a number of the aliphatic unsaturated groups in (B1) ViB1, on the other hand, when (B1) and (B2) are used in combination, a number of the aliphatic unsaturated groups in (B) is a total of the number of the aliphatic unsaturated groups in (B1) ViB1 and the number of the aliphatic unsaturated groups in (B2) ViB2.

Also, in the viewpoints of providing good adhesiveness, and suppressing temperature change of the cured product, a ratio of HS based on ViB (HS/ViB is 0.95 to 3, preferably 1 to 2.

In the viewpoints of good adhesiveness and further suppressing temperature change of the cured product, a ratio of HS based on ViD (HS/ViD) is 1.5 to 3, preferably 1.8 to 2.5.

In the viewpoints of a photoreaction initiating function, and heat resistance and legibility (high transmittance and low fogging property) at the time of curing, (C) is preferably 0.05 to 50 parts by weight based on 100 parts by weight of (B), more preferably 0.1 to 40 parts by weight.

In the viewpoints of deforming resistance and legibility, a total amount of (A) to (D) is preferably 55% by weight or more in the composition, more preferably 75% by weight or more, further preferably 90% by weight or more.

The composition of the present invention preferably further contains (E) a silicone resin-series adhesion improver (provided that (A), (B) and (D) are to be excluded). The silicone resin-series adhesion improver means a silicone resin having tackiness and is formulated to further strengthen and to be stable adhesiveness of the ultraviolet-curable silicone resin composition of the present invention, depending on necessity. A high improved effect can be expected particularly when the adherent is a polarizing plate.

In the viewpoints of stickiness and economy, (E) is preferably one or more silicone resin-series adhesion improver (provided that it does not contain an aliphatic unsaturated group and a mercapto group) selected from the group consisting of an MQ resin, an MDQ resin, an MT resin, an MDT resin, an MDTQ resin, a DQ resin, a DTQ resin and a TQ resin, in the point of fluidity and easiness in synthesis, it is more preferably one or more silicone resin-series adhesion improver selected from the group consisting of an MQ resin, an MDQ resin, an MDT resin and an MDTQ resin, further preferably one or more silicone resin-series adhesion improver selected from the group consisting of an MQ resin, an MDQ resin and an MDT resin, and in the viewpoints of high stickiness and easiness in structural control, an MQ resin is further preferred.

The MQ resin may be mentioned a silicone resin an average structural formula of which is represented by the following formula:

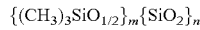

(wherein m+n=1, and m and n are a number of not 0), the MDQ resin may be mentioned a silicone resin an average structural formula of which is represented by the following formula:

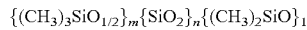

(wherein m+n+l=1, and m, n and l are a number of not 0), the MT resin may be mentioned a silicone resin an average structural formula of which is represented by the following formula:

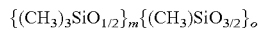

(wherein m+o=1, and m and o are a number of not 0), the MDT resin may be mentioned a silicone resin an average structural formula of which is represented by the following formula:

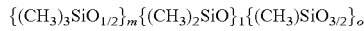

(wherein m+l+o=1 and m, l and o are a number of not 0), the MDTQ resin may be mentioned a silicone resin an average structural formula of which is represented by the following formula:

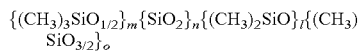

(wherein m+n+l+o=1, and m, n, l and o are a number of not 0), the DQ resin may be mentioned a silicone resin an average structural formula of which is represented by the following formula:

(wherein n+l=1, and n and l are a number of not 0), the DTQ resin may be mentioned a silicone resin an average structural formula of which is represented by the following formula:

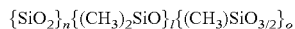

(wherein n+l+o=1, and n, l and o are a number of not 0), and the TQ resin may be mentioned a silicone resin an average structural formula of which is represented by the following formula:

(wherein n+o=1, and m and o are a number of not 0).

A weight average molecular weight of (E) is preferably 2,000 to 100,000, more preferably 5,000 to 80,000, further preferably 10,000 to 60,000. Here, the weight average molecular weight is a value obtained by gel permeation chromatograph analysis (GPC) using polystyrenes as a calibration curve.

(E) can be used in an amount of 150 parts by weight or less based on 100 parts by weight of (B), and in the point of improving adhesiveness to the substrate, (E) is preferably 5 to 150 parts by weight, more preferably 10 to 120 parts by weight, further preferably 15 to 100 parts by weight.

In the composition of the present invention, an additive such as a silane coupling agent (provided that (D) is excluded), a polymerization inhibitor, an antioxidant, a UV absorber which is alight-resistant stabilizer, a photostabilizer, etc., may be formulated within the range which does not impair the effects of the present invention. The composition of the present invention may contain a polyorganosiloxane (for example, a branched polyorganosiloxane containing an aliphatic unsaturated group) having an aliphatic unsaturated group other than (B) within the range which does not impair the effects of the present invention, but preferably not contained.

The silane coupling agent may be mentioned, for example, 3-aminopropyl-triethoxysilane, 3-aminopropyltrimethoxysilane, 3-mercaptopropyltriethoxysilane, 3-mercaptopropyltrimethoxysilane. 3-glycidoxypropyltrimethoxysilane, 3-glycidoxy-propyltriethoxysilane, trimethoxysilylpropyldiallylisocyanurate, bis(trimethoxysilyl-propyl)allylisocyanurate, tris(trimethoxysilylpropyl)isocyanurate, triethoxysilyl-propyldiallylisocyanurate, bis(triethoxysilylpropyl)allylisocyanurate and tris(trimethoxysilylpropyl)isocyanurate.

The polymerization inhibitor may be mentioned hydroquinone, p-methoxyphenol, t-butylcatechol, phenothiazine, etc.

The antioxidant can be used for preventing oxidation of the cured product of the composition, and for improving weather resistance, and there may be mentioned, for example, a hindered amine series or a hindered phenol antioxidant, etc. The hindered amine series antioxidant may be mentioned, for example, N,N',N'',N'''-tetrakis-(4,6-bis(butyl-(N-methy)-2,2,6,6-tetramethylpiperidin-4-yl)amino)-triazine-2-yl)-4,7-diazadecan-1,10-diamine, a polycondensation product of dibutylamine-1,3,5-triazine-N,N'-bis-(2,2,6,6-tetramethyl-4-piperidyl-1,6-hexamethylenediamine-N-(2,2,6,6-tetramethyl-4-piperidyl)butylamine, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], a polymer of dimethyl succinate and 4-hydroxy-2,2,6,6-tetramethyl-1-piperidinethanol, [a reaction product of decanedioic acid bis(2,2,6,6-tetramethyl-1 (octyloxy)-4-piperidyl) ester, 1,1-dimethylethylhydroperoxide and octane] (70%)-polypropylene (30%), bis(1,2,2,6,6-pentamethyl-4-piperidyl)[[3,5-bis(1,1-dimethylethyl)-4-hydroxyphenyl]methyl]butylmalonate, methyl 1,2,2,6,6-pentamethyl-4-piperidylsebacate, bis(2,2,6,6-tetramethyl-4-piperidyl)sebacate, bis(1,2,2,6,6-pentamethyl-4-piperidyl) sebacate, 1-[2-[3-(3,5-di-tert-butyl-4-hydroxyphenyl) propionyloxy]ethyl]-4-[3-(3,5-di-tert-butyl-4-hydroxyphenyl)propionyloxy]-2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro[4.5]decan-2,4-dione, etc., but the present invention is not limited by these. The hindered phenol series antioxidant may be mentioned, for example, pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl)propionate), N,N'-hexane-1,6-diylbis[3-(3,5-di-tert-butyl-4-hydroxyphenylpropioamide), benzenepropanoic acid 3,5-bis(1,1-dimethylethyl)-4-hydroxy C7-C9 side chain alkyl ester, 2,4-dimethyl-6-(1-methylpentadecyl)phenol, diethyl[[3,5-bis(1,1-dimethylethyl)-4-hydroxyphenyl]methyl]phosphonate, 3,3',3'',5,5',5''-hexane-tert-butyl-4-a,a',a''-(mesitylene-2,4,6-tolyl)tri-p-cresol, calcium diethylbis[[[3,5-bis-(1,1-dimethylethyl)-4-hydroxyphenyl]methyl]phosphonate], 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione, a reaction product of N-phenylbenzeneamine and 2,4,4-trimethylpentene, 2,6-di-tert-butyl-4-(4,6-bis(octylthio)-1,3,5-triazine-2-ylamino)phenol, etc., but the invention is not limited by these. The above-mentioned antioxidant may be used alone or in combination of two or more.

The photostabilizer can be used for preventing from deterioration by photo-oxidation of the cured product, and may be mentioned, for example, a benzotriazole series, hindered amine series or benzoate series compound, etc. The UV absorber which is a light-resistant stabilizer can be used for improving weather resistance by preventing from light deterioration, and may be mentioned, for example, a UV absorber such as a benzotriazole series, triazine series, benzophenone series or benzoate series ones, etc. The UV absorber may be mentioned, for example, a benzotriazole series UV absorber such as 2,4-di-tert-butyl-6-(5-chlorobenzotriazol-2-yl)phenol, 2-(2H-benzotriazol-2-yl)-4,6-di-tert-pentylphenol, 2-(2H-benzotriazol-2-yl)-4-(1,1,3,3-tetramethylbutyl)phenol, a reaction product of methyl 3-(3-(21-1-benzotriazol-2-yl)-5-tert-butyl-4-hydroxyphenyl)propionate/polyethylene glycol 300, 2-(2H-benzotriazol-2-yl)-6-(straight and branched dodecyl)-4-methylphenol, etc., a triazine series UV absorber such as 2-(4,6-diphenyl-1,3,5-triazine-2-yl)-5-[(hexyl)oxy]-phenol, etc., a benzophenone series UV absorber such as octabenzone, etc., a benzoate series UV absorber such as 2,4-di-tert-butylphenyl-3,5-di-tert-butyl-4-hydroxybenzoate, etc., but the invention is not limited by these. The above-mentioned UV absorber may be used alone or in combination of two or more. The photostabilizer is preferably a hindered amine series one. Of these, it is preferred to use a tertiary amine-containing hindered amine series photostabilizer to improve storage stability of the composition. The tertiary amine-containing hindered amine series photostabilizer may be mentioned a photostabilizer such as Tinuvin 622LD, Tinuvin 144, CHIMASSORB 119FL (all mentioned above are available from BASF AG); MARK LA-57, LA-62, LA-67, LA-63 (all mentioned above are available from ASAHI DENKA KOGYO K.K. now ADEKA CORPORATION); SANDOL LS-765, LS-292, LS-2626, LS-1114, LS-744 (all mentioned above are available from SANKYO COMPANY. LTD. now DAIICHI SANKYO CO., LTD.), etc.

The composition of the present invention is preferably not containing an inorganic filler in the point of obtaining a desired E hardness.

The composition of the present invention preferably has a viscosity at 23° C. of 50 to 10000 cP in the viewpoint of workability when it is coated between the image display portion and the protective portion, more preferably 70 to 9000 cP, further preferably 100 to 7000 cP.

The composition of the present invention can be obtained by formulating (A) to (D), and optional components of (E) and an additive. For the preparation, it is preferred that after formulating (A), (B) and the optional (E), in the absence of UV ray, (C) and (D) and the optional polymerization inhibitor are formulated. In detail, for example, in a room in which extraneous substances in the air are controlled such as a clean room, (A), (B), and if necessary, (E) are charged in 5 L of an almighty mixing stirrer equipped with a defoaming apparatus under reduced pressure, the mixture is uniformly mixed at a room temperature (10 to 30° C.), with a low speed for 30 minutes, thereafter, in a room in which a UV ray is cut such as a yellow room, (C), (D) and a polymerization inhibitor, etc., which are additives with small amounts are added, under ice-water cooling (10° C. or lower), the resulting mixture is uniformly mixed with a low speed for 30 minutes under reduced pressure while cooling, and after defoaming, the mixture is filtered by using a membrane filter having fine pores with a size of 10 μm or less, etc., to obtain an ultraviolet-curable silicone resin composition.

The composition of the present invention can be cured by irradiating a UV ray. The lamp having a wavelength region which is in the range capable of causing a reaction of (C) may be mentioned, for example, a high-pressure mercury lamp (UV-7000) and a metal halide lamp (MHL-250, MHL-450, MHL-150, MHL-70) manufactured by USHIO INC., a metal halide lamp (JM-MTL 2KW) manufactured by South Korea: JM tech Co., a UV ray irradiating lamp (OSBL360) manufactured by Mitsubishi Electric Corporation, a UV ray irradiating machine (UD-20-2) manufactured by Japan Storage Battery Co., Ltd., a fluorescent lamp (FL-20BLB)) manufactured by Toshiba Corporation, and an H valve, H plus valve, D valve, Q valve, M valve. etc. manufactured by Fusion Co. etc. An irradiation dose is preferably 100 to 10000 ml/cm$^2$, more preferably 300 to 5000 mJ/cm$^2$, further preferably 500 to 3500 mJ/cm$^2$.

The cured product of the composition of the present invention has the following suitable physical properties.

[Visible Light Transmittance after Curing]

The composition of the present invention can make a visible light transmittance after curing with a cured thickness of 150 μm 95% or more, so that it is preferred in the point of legibility. The visible light transmittance is more preferably 96% or more, further preferably 98% or more. In the point of visible transmittance, an amount of (C) to be used is preferably suppressed. Also, each component of (A) and (B) is separately, or uniformly mixed, and then, subjecting to heat treatment at 80 to 180° C., whereby the visible light transmittance after curing can be improved. The heat treatment is preferred in the point of stability with a lapse of time.

[Cure Shrinkage]

The composition of the present invention can be made a cure shrinkage 1.0% or less, so that when it is applied to an image display device, it is preferred in the viewpoints of capable of easily preventing from distortion and capable of ensuring legibility. The cure shrinkage is preferably 0.5% or less, more preferably 0.3% or less, further preferably 0.2% or less.

[E Hardness after Curing]

The composition of the present invention can be made an E hardness after curing 5 to 40, so that when it is applied to an image display device, it is preferred in the viewpoints of capable of easily relaxing a stress from outside suitably, and capable of ensuring legibility by preventing from migration of moisture even under high temperature and high humidity. The E hardness is preferably 5 to 35, more preferably 10 to 30.

[Elongation after Curing]

The composition of the present invention can be made an elongation after curing 50% or more, so that it is preferred in the points that it is excellent in relaxing a stress from outside, and capable of ensuring deforming resistance. The elongation after curing is preferably 80% or more, more preferably 100% or more, further preferably 200% or more.

[Storage Modulus after Curing]

The composition of the present invention can be made a ratio ($G'(T)/G'(23)$) of a storage modulus MS (T) at a temperature range of $-50°$ C. to 100° C. based on a storage modulus $G'(23)$ at 23° C. after curing preferably 0.1 to 30, so that it is preferred in the point that temperature change of the cured product can be suppressed. The ratio ($G'(T)/G'(23)$) of the storage modulus MS(T) is preferably 0.5 to 10,

[Loss Modulus after Curing]

The composition of the present invention can be made a ratio ($G''(T)/G''(23)$) of a storage modulus $M_1(T)$ at a temperature range of $-50°$ C. to 100° C. based on a loss modulus $G'(23)$ at 23° C. after curing 0.1 to 300, so that it is preferred in the points that temperature change of the cured product can be suppressed, and migration of moisture under high temperature and high humidity can be suppressed. The ratio ($G''(T)/G''(23)$) of the storage modulus $M_1(T)$ is preferably 0.5 to 100.

The composition of the present invention can be suitably and preferably used in an image display device, in particular, it is preferred as a resin to be interposed between a protective portion and an image display portion of a flat panel type image display device.

Specifically, the composition of the present invention is coated on a protective panel constituting a transparent protective portion formed by an optical plastic, etc., then, an image display panel constituting the image display portion is laminated thereto and an UV ray can be irradiated. A step may be provided at the peripheral portion of the protective panel to prevent from outflow of the composition of the present invention.

The composition of the present invention is a liquid state and excellent in coating property without causing display failure cased by deformation of an image display portion and without lowering legibility, whereby a UV ray curable resin capable of realizing a display with high brightness and high contrast can be provided. The composition of the present invention is suitable for production of a large-sized image display device having an image display panel of 5 to 100 inches, more preferably 7 to 80 inches, further preferably 10 to 60 inches, or suitable for production of an ultra-thin type image display device having an image display device of preferably 10 to 500 μm, more preferably 20 to 450 μm, further preferably 50 to 400 μm.

EXAMPLES

In the following, the present invention will be explained in more detail by referring to Examples and Comparative examples. Part(s) and % each represent part(s) by weight and % by weight otherwise specifically mentioned. The present invention is not limited by these Examples. For curing each composition prepared in Examples and Comparative examples, a high pressure mercury lamp: UVL-4001M manufactured by USHIO INC. was used, and carried out at 120 w/cm$^2$ with a UV ray energy irradiation dose of 2000 mJ/cm$^2$ (measured by an actinometer: UIT-250, manufactured by USHIO INC.), otherwise specifically mentioned. Also, in Examples 26-29, at the time of curing, a metal halide lamp: MHL-250 manufactured by USHIO INC. was used, and carried out at 250 w/cm$^2$ with a UV ray energy irradiation dose of 2000 mJ/cm$^2$ (measured by an actinometer: UIT-250, manufactured by USHIO INC.), otherwise specifically mentioned.

[Evaluation Conditions of Physical Properties]

(1) Viscosity

By using a rotational viscometer (Vismetron VDA-L) (manufactured by Shibaura System K.K.), a viscosity at 23° C. with 60 rpm was measured using No. 2 rotor in the range of 400 cP or less, No. 3 rotor in the range of exceeding 400 to 1500 cP, and No. 4 rotor in the range of exceeding 1500 cP.

(2) Measurement of Number of Mercapto Groups

As an iodine source, $\frac{1}{10}$ N iodine solution (special grade reagent) was used, and a number of mercapto groups per unit weight was determined by the colorimetric titration.

Calculation method: SH content (mmol/g)=(A×P×0.1)/(W×C)

A: A titrated amount of the iodine solution required until causing color change

P: Calibration coefficient of the iodine solution (Calibration coefficient described in the reagent): described when calibration is required W: Weight (g) of sample C: Non-volatile component of the sample Provisional measurement was carried out to obtain an amount of the iodine solution, then, measurement was carried out three times with good precision and an average value of the three times was obtained.

(3) Measurement of Number of Aliphatic Unsaturated Groups

A number of units was obtained from the ratio of the peak intensities of respective peaks as the peaks of Si—CH$_3$ (around 0.1 ppm). Si-Ph (around 7.3-7.7 ppm) and CH$_3$Si—CH=CH$_2$ (around 5.7-6.3 ppm) in NMR measurement correspond to a (CH$_3$)$_2$SiO unit, a Ph$_2$-SiO unit and a (CH$_3$)$_2$Si—CH=CH$_2$O$_{1/2}$ unit, respectively, to obtain an average structural formula, from which a molecular weight was obtained and a number of the unsaturated group was calculated.

(4) Visible Light Transmittance

A transmittance in the visible region wavelength (360 to 760 nm) at 23'C was measured by a spectrophotometer (CM-3500d manufactured by Minolta Co., Ltd.) by filling a liquid state material in a quartz cell with a thickness of 10 mm or a cured product with a thickness of 150 µm.

(5) Cure Shrinkage

Specific gravities of the composition before curing and after curing were measured by an electronic gravimeter (SD-120L manufactured by MIRAGE), and it was calculated from the difference between the specific gravities using the following formula.

Cure shrinkage(%)=(Specific gravity after cuting−Specific gravity before curing)/Specific gravity after cuting)×100

(6) E Hardness after Curing

According to JIS K 6253 E, E hardness of the cured product at 23° C. was measured by DUROMETER HARDNESS TYPE E (manufactured by ASKER).

(7) Elongation after Curing

According to JIS K 6301, elongation of the cured product at 23° C. was measured by using a Schopper tensile tester (manufactured by Toyo Seiki Seisaku-sho Ltd.).

(8) Dot Pressing Test

The composition was coated between a 0.6 mm-thick glass plate for a 3.5 inch display (a length of a diagonal line of the image display portion is 3.5 inch) and a 0.4 mm-thick PMMA plate for a 3.5 inch display (a length of a diagonal line of the image display portion is 3.5 inch) so that its thickness became 200 µm, and cured by a UV ray with an irradiated energy dose of 2000 mJ/cm² to prepare a sample.

After 24 hours from completion of the UV ray irradiation, the PMMA (polymethyl methacrylate) plate side of the sample was made upside, a metal rod having a diameter of 10 mm and a semi-circular tip portion was pressed to a portion at the center part of the sample with a speed of 7.5 mm/min and continued to pressing until the load became 20 kgf/cm².

By the pressurization, if fine cracks were generated at the pressured portion of the glass plate, PMMA plate or cured composition, appearance of the pressured portion changed as compared with the non-pressured portion due to the presence of the cracks or color change to white color. The change of the appearance was observed by naked eyes, and if the change in appearance at the pressured portion was continued, then, it was judged as ×, while if the change in appearance at the pressured portion was not confirmed, then, it was judged as ◯.

(9) Storage Modulus and Loss Modulus after Curing

A storage modulus and a loss modulus were measured with regard to the 2 mm-thick cured product by using a viscoelasticity measurement device (RSA3 manufactured by TA Instruments) at a measured frequency of 120 Hz.

(10) Crack Resistance and Change in Color (10-1) Heat Shock

The composition was coated between a 1 mm-thick glass plate and a 1 mm-thick PMMA plate so that the thickness thereof became 200 µm, cured by a UV ray with an irradiated energy dose of 3000 ml/cm², and an environmental test was carried out with a temperature cycle (maintained at each temperature for 30 minutes) of from −50° C. to 125° C. (Name of apparatus: TSA-71S-A manufactured by ESPEC CORP.).

Thereafter, the sample was returned to the condition of 23° C., and the states of the cured product, PMMA and glass were observed by an optical microscope (10-fold).

When 0.02 mm or more of crack to one direction and/or 0.02 mm or more of an air layer to one direction was/were generated at the cured product, and/or 0.02 mm or more of a damage to one direction was generated at either of the PMMA and the glass, then, it was judged as NG, and while no crack, air layer or damage was observed, then, it was judged as OK.

(10-2) Under High Temperature and High Humidity

The cured product was allowed to stand in a constant temperature and humidity chamber set at high temperature and high humidity conditions of a temperature of 85° C. and a humidity of 85% RH for 500 hours, and after returning the product at the condition of a temperature of 23° C. and a humidity of 50%, evaluation was carried out by a yellow index which is an index of the degree of color change by a spectrophotometer (CM-3500d manufactured by Minolta Co., Ltd.).

When the yellow index is 1.0% or more, then, it is NG, and when the yellow index is less than 1.0%, then, it is made OK.

(11) Cohesive Failure Rate (11-1) Against Acryl, Against Glass

On each adherend (PMMA, polycarbonate, glass) with a width of 25 mm, the composition was so coated that the thickness thereof became 0.1 mm with a width of 25 mm and a length of 10 mm or more, then, a reinforced glass plate with a thickness of 2 mm and a width of 25 mm was overlapped thereon so that an overlapped width of the composition became 10 mm, and cured by a UV ray with an irradiated energy dose of 2000 mJ/cm² to prepare a sample.

With regard to the samples immediately after preparation of the sample, 1 day later and 3 days later, shear adhesion test was carried out to peel the adherend and the glass plate by pulling them with a tension rate of a measured rate of 10 mm/min using an autograph manufactured by Shimadzu Corporation.

An area S mm² at the peeled portion of the ultraviolet-curable resin composition on the adherend was obtained, and calculated the value:

(100×S)/(10×25)

to made it the cohesive failure rate (%).

(11-2) With Polarizing Plate

As a polarizing plate film, a polarizing film for a liquid crystal with a width of 25 mm (product name: SEG1425DU manufactured by Nitto Denko Corporation), a film subjected to anti-glare treatment (product name: AG150 manufactured by Nitto Denko Corporation), and a film subjected to anti-reflection treatment (product name: ARS Type manufactured by Nitto Denko Corporation) were prepared. The composition was so coated onto each polarizing film that the thickness thereof became 0.1 mm with a width of 25 mm and a length of 60 mm or more, then, a reinforced glass plate with a thickness of 2 mm and a width of 25 mm was overlapped thereon so that an overlapped width of the composition became 10 mm, and cured by a UV ray with an irradiated energy dose of 2000 mJ/cm² to prepare a sample. With regard to the samples immediately after preparation of the sample and 2 hours later, peel adhesion test was carried out to peel the polarizing film which is the adherend and the glass plate by pulling them at an angle of 180° with a tension rate of a measured rate of 10 mm/min using an autograph manufactured by Shimadzu Corporation.

An area S mm² at the peeled portion of the ultraviolet-curable resin composition on the adherend was obtained, and calculated the value:

$$(100 \times S)/(10 \times 25)$$

to made it the cohesive failure rate (%),
(12) Fogging

The cured product was stored under the conditions of a temperature of 85° C. and a humidity of 85% for 500 hours, then, returned to the state of 23° C. and a humidity of 50%, and according to JIS K 7105, fogging was measured by using a Haze meter NDH5000 (manufactured by Nippon Denshoku Industries, Co., Ltd.).
(13) Color Change at High Temperature The cured product was stored under the conditions of a temperature of 85° C. and a humidity of 85% for 500 hours, then, returned to the state of 23° C. and a humidity of 50%, and an yellow index which is an index of a degree of color change was measured by a spectrophotometer (CM-3500d manufactured by Minolta Co., Ltd. now Konika Minolta Holdings, Inc.) to carry out the evaluation.
(14) Coating Property (Wetting Property with a Part)

Onto a center portion of a glass plate having 5 cm square which has been washed with a neutral detergent and dried was dropped 2 g of the composition from 10 ml of a bottle, and it was evaluated by the time until the composition spread to the edge of the glass. Evaluation was carried out at a temperature of 23° C. and a humidity of 50%.

When the composition reached to the edge portion of the glass within 60 seconds, then, it was judged as ○, when the composition reached to the edge portion of the glass exceeding 60 seconds and within 120 seconds, then, it was judged as □, and when the composition reached to the edge portion of the glass exceeding 120 seconds, then, it was judged as ×.

Synthetic Example (A) in Examples and Comparative examples is as follows.
Synthesis of (a-1)

To 1549.2 g (12 mol) of dimethyldichlorosilane, 21.7 g (0.2 mol) of trimethylchlorosilane, 196.4 g (1.0 mol) of 3-mercaptopropyltrimethoxysilane and 1500 g of toluene charged in 5 L of a separable flask equipped with a reflux tube for cooling, a dropping funnel and a three-one motor as a stirring device was added dropwise a mixture of 1000 g of water and 500 g of toluene from the dropping funnel over about 1 hour. Hydrolysis was carried out at 70° C. under heating and stirring for 2 hours. After completion of the reaction, the aqueous phase was separated, washed with water, and then, dehydrated at 100° C. to 125° C. under heating. After completion of the dehydration, 1.5 g of a 50% aqueous potassium hydroxide solution was added to the residue, and the mixture was stirred at 115 to 125° C. under heating for 5 hours to carry out condensation reaction. The mixture was neutralized with ethylenechlorohydrin followed by removing 1200 to 1300 g of toluene, and was filtered by using SUPER CELITE FLOSS as a filtration aid, thereafter, the remaining toluene was removed under a constant pressure and under reduced pressure to obtain 928 g of a polymethylsiloxane having a mercaptopropyl group.
Average structural formula:

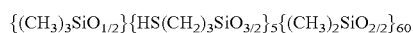

Viscosity: 294 cP
Transmittance with a thickness of 10 min. 923%

Number of mercapto groups per unit weight: 0.98 mmol/g
(a-2) to (a-3) are as follows.
(a-2) Polymethylsiloxane having Mercaptopropyl Group
Average structural formula:

Viscosity: 110 cP
Transmittance with a thickness of 10 mm: 91.6%
Number of mercapto groups per unit weight: 4.29 mmol/g
(a-3) Polymethylsiloxane having Mercaptopropyl Group
Average structural formula:

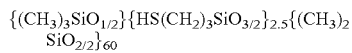

Viscosity: 220 cP
Transmittance with a thickness of 10 mm: 93.3%
Number of mercapto groups per unit weight: 0.52 mmol/g
(a-4) Polymethylsiloxane having Mercaptopropyl Group
Average structural formula:

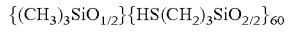

Viscosity: 330 cP
Transmittance with a thickness of 10 mm: 93.1%
Number of mercapto groups per unit weight: 0.97 mmol/g
(a-6) Polymethylsiloxane having Mercaptopropyl Group
Average structural formula: $\{(CH_3)_3SiO_{1/2}\}_5\{HS(CH_2)_3SiO_{3/2}\}_5$
Viscosity: 60 cP
Transmittance with a thickness of 10 mm: 92.8%
Number of mercapto groups per unit weight: 4.60 mmol/g
(a-5) is as follows.
Synthesis of (a-5)

To 253.2 g (1.0 mol) of diphenyldichlorosilane, 141.5 g (0.48 mol) of triphenylchlorosilane, 406.7 g (115 mol) of dimethyldichlorosilane, 98.2 g (0.5 mol) of 3-mercaptopropyltrimethoxysilane and 1000 g of toluene charged in 5 L of a separable flask equipped with a reflux tube for cooling, a dropping funnel and a three-one motor as a stirring device was added dropwise a mixture of 1000 g of water and 700 g of toluene from the dropping funnel over about 1 hour. Hydrolysis was carried out at 70° C. under heating and stirring for 2 hours. After completion of the reaction, the aqueous phase was separated, washed with water, and then, dehydrated at 100° C. to 125° C. under heating. After completion of the dehydration. 0.5 g of a 50% aqueous potassium hydroxide solution was added to the residue, and the mixture was stirred at 115 to 125° C. under heating for 5 hours to carry out condensation reaction. The mixture was neutralized with ethylenechlorohydrin followed by removing 1300 to 1500 g of toluene, and was filtered by using SUPER CELITE FLOSS as a filtration aid, thereafter, the remaining toluene was removed under a constant pressure and under reduced pressure to obtain 511 g of a polymethylsiloxane having a mercaptopropyl group.
Average structural formula:

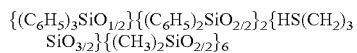

Viscosity: 23000 cP
Transmittance with a thickness of 10 mm: 82.1%
Number of mercapto groups per unit weight: 0.82 mmol/g
(B1) in Examples and Comparative examples is as follows.
Synthesis of (b1-1)

In 3 L of a separable flask equipped with a reflux tube for cooling and a three-one motor as a stirring device were charged 1800 g of 1,1,3,3,5,5,7,7-octamethylcyclotetrasiloxane, 260 g of 1,1,3,3,5,5,7,7-octaphenylcyclotetrasiloxane and 37.5 g of 1,1,3,3-tetramethyl-1,3-divinyldisiloxane, the mixture was dehydrated 150 to 160° C. under 0.5 Nm³/h of nitrogen gas stream for 3 hours under heating and stirring, and then. 0.1 g of potassium hydroxide was added to the residue and the resulting mixture was stirred under heating. The stirring and heating were continued until the potassium hydroxide had been dissolved uniformly in the flask and the mixture had become viscous where the viscosity of which had become 2000 cP to 2500 cP. Thereafter, the mixture was neutralized with 10 g of ethylenechlorohydrin at 100° C., filtered by using SUPER CELITE FLOSS as a filtration aid; thereafter, low-boiling point components were removed at 170 to 180° C. under reduced pressure of 2 mmHg to obtain 1867 g of a vinyl-terminated polymethylphenylsiloxane both ends of which are terminated by dimethylvinylsiloxy groups, the diphenylsiloxy unit of which is 5 mol %, and the remainder is the dimethylsiloxy unit,
Viscosity: 3200 cP
Average number of the aliphatic unsaturated groups in one molecule: 2
Average structural formula by NMR measurement:

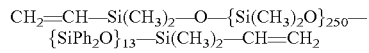

Molecular weight: 21030
(b1-2) Vinyl-Terminated Polymethylphenylsiloxane
Vinyl-terminated polymethylphenylsiloxane both ends of which are terminated by dimethylvinylsiloxy groups, the diphenylsiloxy unit of which is 5 mol %, and the remainder is the dimethylsiloxy unit
Average number of the aliphatic unsaturated groups in one molecule: 2
Average structural formula by NMR measurement:

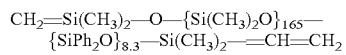

Viscosity: 1020 cP
Molecular weight: 13910
In FIG. 1, a chart of NMR measurement is shown.
(b1-3) Vinyl-Terminated Polymethylphenylsiloxane
Vinyl-terminated polymethylphenylsiloxane both ends of which are terminated by dimethylvinylsiloxy groups, the diphenylsiloxy unit of which is 5 mol %, and the remainder is the dimethylsiloxy unit
Average number of the aliphatic unsaturated groups in one molecule: 2
Average structural formula by NMR measurement:

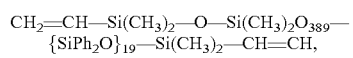

Viscosity: 9020 cP
Molecular weight: 32660
(b1-4) Vinyl-Terminated Polymethylphenylsiloxane
Vinyl-terminated polymethylphenylsiloxane both ends of which are terminated by dimethylvinylsiloxy groups, the diphenylsiloxy unit of which is 5 mol %, and the remainder is the dimethylsiloxy unit
Average number of the aliphatic unsaturated groups in one molecule: 2
Average structural formula by NMR measurement:

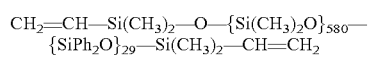

Viscosity: 18900 cP
Molecular weight: 48720
(b1-5) Vinyl-Terminated Polymethylphenylsiloxane
Vinyl-terminated polymethylphenylsiloxane both ends of which are terminated by dimethylvinylsiloxy groups, the diphenylsiloxy unit of which is 5 mol %, and the remainder is the dimethylsiloxy unit Average number of the aliphatic unsaturated groups in one molecule: 2
Average structural formula by NMR measurement:

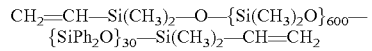

Viscosity: 20450 cP
Molecular weight: 50394
(b1-6) Vinyl-Terminated Polymethylphenylsiloxane
Vinyl-terminated polymethylphenylsiloxane both ends of which are terminated by dimethylvinylsiloxy groups, the diphenylsiloxy unit of which is 33 mol %, and the remainder is the dimethylsiloxy unit
Average number of the aliphatic unsaturated groups in one molecule: 2
Average structural formula by NMR measurement:

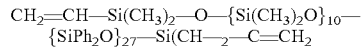

Viscosity: 2070 cP
Molecular weight: 4030
(B2) in Examples and Comparative examples are as follows.
(b2-1) is an $M_6D'Q_8$ resin having an average structural formula of

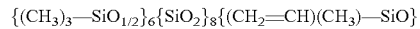

Weight average molecular weight: 22000
The weight average molecular weight is a value obtained by a gel permeation chromatograph analysis (GPC) and using polystyrene(s) as a calibration curve,
(C) in Examples and Comparative examples are as follows.
(c-1) 2-Hydroxy-2-methylpropiophenone
(c-2) 2,2-Dimethoxy-1,2-diphenylethan-1-one
(c-3) 1-Hydroxy-cyclohexyl-phenyl-ketone
(c-4) 2-Methyl-1-[4-(methylthio)phenyl]-2-morpholinopropan-1-one
(c-5) 2-Benzyl-2-dimethylamino-(4-morpholinophenyl)-butanone-1
(D) in Examples and Comparative examples are as follows.
(d-1) 3-Methacryloxypropyltrimethoxysilane
(E) in Examples and Comparative examples are as follows.
(e-1) MQ Resin
MQ resin having an average structural formula of $\{(CH_3)_3SiO_{1/2}\}\{SiO_2\}_{3.5}$
Weight average molecular weight: 52000
The weight average molecular weight was measured by gel permeation chromatograph analysis (GPC) and using polystyrenes as a calibration curve.
Such an MQ resin can be obtained by co-hydrolysis—polycondensation of a tetraalkoxysilane or a tetrachlorosilane and a trialkylchlorosilane. Also, water glass may be used as a starting material of a Q unit. Specifically, the material prepared as mentioned below was used. In 3 L of a separable flask equipped with a reflux tube for cooling and a three-one motor as a stirring device was charged 293 g of hydrochloric acid, the temperature inside the flask was adjusted to 5° C. to 2° C. 440 g of water was charged while stirring, and 308 g of water glass No. 3 (S40 sodium silicate No. 3) was added dropwise to the mixture over 1 hour. Then, 316 g of isopropyl alcohol was charged in the flask to carry out hydrosolation. Thereafter, a mixture comprising 128 g of trimethylchlorosilane and 139 g of xylene was added dropwise to the above mixture over about 10 minutes, and the resulting mixture was stirred by setting the temperature in the flask to −5° C. to 2° C. for 1 hour. Then, the temperature of the mixture was raised to about 80° C., thereafter, the mixture was refluxed at 80° C. for 2 hours under heating. Then, 24 g of xylene was added to the mixture, and the resulting mixture was stirred for 30 minutes and allowed to stand for 30 minutes to separate the liquids. Thereafter, dehydration and precipitation were carried out at 125-140° C., and a non-volatile component was measured. An amount of the non-volatile component was 58%. The MQ resin thus obtained was used by mixing with a vinyl-terminated polymethylphenylsiloxane used in each Example and Comparative example, and removing xylene.

(F) in Examples and Comparative examples are as follows.
(f-1) p-t-Butylcatechol (polymerization inhibitor)
(f-2) p-Methoxyphenol (polymerization inhibitor)

Example 1

In 5 L of an almighty mixing stirrer (manufactured by Dalton Co., Ltd.) were charged 10.5 parts by weight (105 g) of mercaptopropyl group-containing polymethylsiloxane (a-1) of synthetic example and 87.9 parts by weight (879 g) of vinyl-terminated polymethylphenylsiloxane (b1-1) of synthetic example, and the mixture was uniformly mixed at room temperature (22° C.) under the rotation conditions of a low-speed lever for 30 minutes. After uniformly mixing, a dissolved mixture of 0.009 parts by weight (0.09 g) of p-t-butylcatechol (f-1) and 0.26 parts by weight (2.6 g) of 2-hydroxy-2-methylpropiophenone (c-1), and 1.29 parts by weight (12.9 g) of 3-methacryloxypropyltrimethoxysilane (d-1) were further added to the mixture, and the resulting mixture was uniformly mixed under ice-water cooling (8° C.) under the rotation conditions of a low-speed lever for 30 minutes under cooling and reduced pressure. Thereafter, extraneous substances, etc., were removed by a membrane filter with 10 μm to obtain a composition.

In the same manner as mentioned above and according to the formulation amount shown in Table 1, Example 2 and Comparative examples 1 to 3 were prepared, and evaluation of physical properties was carried out. Also, according to the formulation amount shown in Table 3 and the same manner as mentioned above, Examples 3 to 6 and Comparative examples 4 to 6 were prepared, and evaluation of physical properties was carried out.

Comparative Example 7

Evaluation of SVR1100 (Sony Chemical & Information Device Corp. now Dexerials Corporation) which is a commercially available ultraviolet-curable acrylic resin was carried out for comparison.

With regard to Examples 1 to 2 and Comparative examples 1 to 3, evaluation results of physical properties are shown in Table 2. Also, with regard to Examples 3 to 6 and Comparative examples 4 to 7, evaluation results of physical properties are shown in Table 4.

TABLE 1

|   |   |   | Example 1 | Example 2 | Comparative example 1 | Comparative example 2 | Comparative example 3 |
|---|---|---|---|---|---|---|---|
| (a-1) | Mercaptopropyl group-containing polymethylsiloxane (294 cP) |  | 10.5 | 12.1 | 12.1 | 12.1 | 16.2 |
| (a-2) | Mercaptopropyl group-containing polymethylsiloxane (110 cP) |  |  |  |  |  |  |
| (a-3) | Mercaptopropyl group-containing polymethylsiloxane (220 cP) |  |  |  |  |  |  |
| (a-4) | Mercaptopropyl group-containing polymethylsiloxane (330 cP) |  |  |  |  |  |  |
| (a-5) | Mercaptopropyl group-containing polymethylsiloxane (23000 cP) |  |  |  |  |  |  |
| (a-6) | Mercaptopropyl group-containing polymethylsiloxane (60 cP) |  |  |  |  |  |  |
| (b1-1) | Vinyl-terminated polymethylphenylsiloxane | (3200 cP) | 87.9 | 86.2 | 86.6 | 86.9 | 82.1 |
| (b1-2) | Vinyl-terminated polymethylphenylsiloxane | (1020 cP) |  |  |  |  |  |
| (b1-3) | Vinyl-terminated polymethylphenylsiloxane | (9020 cP) |  |  |  |  |  |
| (b1-4) | Vinyl-terminated polymethylphenylsiloxane | (18900 cP) |  |  |  |  |  |
| (b1-5) | Vinyl-terminated polymethylphenylsiloxane | (20450 cP) |  |  |  |  |  |
| (b1-6) | Vinyl-terminated polymethylphenylsiloxane | (2070 cP) |  |  |  |  |  |
| (c-1) | 2-Hydroxy-2-methylpropiophenone |  | 0.26 | 0.22 | 0.22 | 0.22 | 0.22 |
| (c-2) | 2,2-Dimethoxy-1,2-diphenylethane-1-one |  |  | 0.22 | 0.22 | 0.22 | 0.22 |
| (d-1) | 3-Methacryloxypropyltrimethoxysilane |  | 1.29 | 1.29 | 0.86 | 0.44 | 1.29 |
| (e-1) | MQresin |  |  |  |  |  |  |
| (f-1) | p-t-Butylcatechol |  | 0.009 | 0.0042 | 0.0042 | 0.0042 | 0.0042 |
| (f-2) | p-Methoxyphenol |  |  |  |  |  |  |
|  | Total |  | 100.0 | 100.0 | 100 | 100 | 100.0 |
| HS: | Number of SH group in (A) mmol |  | 10.3 | 11.9 | 11.9 | 11.9 | 15.9 |
| ViB1: | Number of Vinyl group in (B1) mmol |  | 8.3 | 8.2 | 8.2 | 8.3 | 7.8 |
| ViB2: | Number of Vinyl group in (B2) mmol |  | 0.0 | 0.0 | 0.0 | 0.0 | 0.0 |
| ViB: | Number of Vinyl groups in (B1) and (B2) mmol |  | 8.3 | 8.2 | 8.2 | 8.3 | 7.8 |
| Ratio (%) of vinyl groups in (B) based on vinyl groups in (B2) |  |  | 0.0 | 0.0 | 0.0 | 0.0 | 0.0 |
| ViD: | Number of Vinyl group in (D) mmol |  | 5.2 | 5.2 | 3.5 | 1.8 | 5.2 |
| ViB + ViD: | Number of Vinyl groups in (B) and (D) mmol |  | 13.5 | 13.4 | 11.7 | 10.0 | 13.0 |
| HS/(ViB + ViD) |  |  | 0.76 | 0.89 | 1.02 | 1.18 | 1.22 |
| HS/ViD |  |  | 1.99 | 2.28 | 3.43 | 6.70 | 3.05 |
| HS/ViB |  |  | 1.24 | 1.45 | 1.44 | 1.44 | 2.04 |

TABLE 2

|  | Example 1 | Example 2 | Comparative example 1 | Comparative example 2 | Comparative example 3 |
|---|---|---|---|---|---|
| Viscosity of composition  cP/23° C. | 3030 | 2780 | 3200 | 3300 | 3300 |
| Visible light transmittance % after curing | 98.8 | 98.3 | 98.1 | 98.0 | 98.0 |
| Cure shrinkage % | 0.18 | 0.19 | 0.23 | 0.78 | 0.28 |
| E hardness after curing | 20 | 26 | 32 | 42 | 46 |

TABLE 2-continued

|  |  | Example 1 | Example 2 | Comparative example 1 | Comparative example 2 | Comparative example 3 |
|---|---|---|---|---|---|---|
| Elongation after curing | 2 mm-thick × 3 3000 mJ | 150 | 130 | 100 | 90 | 90 |
| Dot pressing test | 10 kgf | ○ | ○ | ○ | ○ | ○ |
|  | 20 kgf | ○ | ○ | ○ | X | X |
|  | 30 kgf | ○ | ○ | ○ | — | — |
|  | 40 kgf | ○ | ○ | ○ | — | — |
|  | 50 kgf | ○ | ○ | — | — | — |
| Storage modulus G' after curing | G'(−50)/G'(23) | 0.68 | 0.88 | 0.81 | 0.87 | 0.83 |
|  | G'(100)/G'(23) | 1.70 | 1.90 | 1.80 | 2.30 | 1.90 |
| Loss modulus after curing | G"(−50)/G"(23) | 2.50 | 2.90 | 2.90 | 3.40 | 3.10 |
|  | G"(100)/G"(23) | 0.68 | 0.87 | 0.77 | 0.72 | 0.75 |
| Crack resistance and change in color | Heat shock | OK | OK | OK | NG*2 | NG*1 |
|  | Under high Temperature and high humidity | OK | OK | OK | OK | OK |
| Cohesive failure rate % adherend acryl | Immediately after irradiation of UV ray | 100 | 100 | 0 | 0 | 100 |
|  | after 1 day | 100 | 100 | 0 | 0 | 100 |
|  | after 3 days | 100 | 100 | 0 | 0 | 100 |
| Cohesive failure rate % adherend glass | Immediately after irradiation of UV ray | 100 | 100 | 70 | 0 | 100 |
|  | after 1 day | 100 | 100 | 85 | 20 | 100 |
|  | after 3 days | 100 | 100 | 100 | 30 | 100 |
| Cohesive failure rate % with polarizing plate | Untreated | 50 | 40 | 5 | 0 | 30 |
|  | Anti-reflection coat | 90 | 80 | 40 | 20 | 70 |
|  | Hard coat | 100 | 100 | 80 | 40 | 90 |
| Fogging | Under high temperature and high humidity | 0.36 | 0.42 | 0.50 | 0.41 | 0.42 |
| Color change at high temperature | Yellow Index | 0.48 | 0.49 | 0.45 | 0.44 | 1.44 |
| Coating property (wetting property with a part) |  | ○ | ○ | ○ | ○ | ○ |

In the table, *1 to *5 are the situation as follows.
*1 Fine cracks generated at 5 portions.
*2 Fine cracks generated at 1 portion.
*3: Cracks generated markedly.
*4: Fogging generated at whole surface.
*5: Fine crack generated at sealing portion and pealing generated at edge surface.

From Tables 1 and 2, it can be understood that Examples 1 and 2 are liquid state, excellent in coating property, and also excellent in transmittance of the cured product. In addition, it can be also understood that the shrinkage ratio at the time of curing is suppressed, both of the hardness and elongation of the cured product are suitable, further, the temperature change is suppressed with regard to the modulus of elasticity of the cured product, and adhesiveness is also good.

On the other hand, in Comparative example 1 in which HS/ViD is out of the scope of the present invention, it is inferior to Examples in the point of adhesiveness, and further in Comparative examples 2 and 3 in which HS/(ViB+ViD) is out of the scope of the present invention, cure shrinkage (hereof is larger than those of Examples, and it can be understood that E hardness is larger and elongation is smaller with regard to the cured products. It can be also understood that suppressing effects against the temperature change with regard to the modulus of elasticity of the cured products are inferior to those of Examples as shown by the values of G"(100)/G"(23).

TABLE 3

|  |  |  | Example 3 | Example 4 | Example 5 | Example 6 | Comparative example 4 | Comparative example 5 | Comparative example 6 | Comparative example 7 |
|---|---|---|---|---|---|---|---|---|---|---|
| (a-1) | Mercaptopropyl group-containing polymethylsiloxane | (294 cP) |  |  |  |  |  |  |  |  |
| (a-2) | Mercaptopropyl group-containing polymethylsiloxane | (110 cP) | 2.9 |  |  |  |  |  |  |  |
| (a-3) | Mercaptopropyl group-containing polymethylsiloxane | (220 cP) |  | 18.5 |  |  |  |  |  |  |
| (a-4) | Mercaptopropyl group-containing polymethylsiloxane | (330 cP) |  |  |  | 7.3 | 12.0 | 22.5 | 35 |  |
| (a-5) | Mercaptopropyl group-containing polymethylsiloxane | (23000 cP) |  |  | 36 |  |  |  |  |  |
| (a-6) | Mercaptopropyl group-containing polymethylsiloxane | (60 cP) |  |  |  |  |  |  |  |  |

TABLE 3-continued

|  |  |  | Example 3 | Example 4 | Example 5 | Example 6 | Comparative example 4 | Comparative example 5 | Comparative example 6 | Comparative example 7 |
|---|---|---|---|---|---|---|---|---|---|---|
| (b1-1) | Vinyl-terminated polymethylphenylsiloxane | (3200 cP) | 95.3 | 79.8 |  |  |  | 75.8 | 63.3 |  |
| (b1-2) | Vinyl-terminated polymethylphenylsiloxane | (1020 cP) |  |  |  |  | 86.3 |  |  |  |
| (b1-3) | Vinyl-terminated polymethylphenylsiloxane | (9020 cP) |  |  |  | 91.3 |  |  |  |  |
| (b1-4) | Vinyl-terminated polymethylphenylsiloxane | (18900 cP) |  |  |  |  |  |  |  |  |
| (b1-5) | Vinyl-terminated polymethylphenylsiloxane | (20450 cP) |  |  |  |  |  |  |  |  |
| (b1-6) | Vinyl-terminated polymethylphenylsiloxane | (2070 cP) |  |  | 61.1 |  |  |  |  |  |
| (c-1) | 2-Hydroxy-2-methylpropiophenone |  | 0.22 | 0.22 | 0.22 | 0.22 | 0.21 | 0.22 | 0.22 |  |
| (c-2) | 2,2-Dimethoxy-1,2-diphenylethane-1-one |  | 0.22 | 0.22 | 0.22 | 0.22 | 0.21 | 0.22 | 0.22 |  |
| (d-1) | 3-Methacryloxypropyltrimethoxysilane |  | 1.29 | 1.29 | 2.5 | 1.13 | 1.27 | 1.27 | 1.27 |  |
| (e-1) | MQresin |  |  |  |  |  |  |  |  |  |
| (f-1) | p-t-Butylcatechol |  | 0.0042 | 0.0042 | 0.0042 | 0.0042 | 0.0042 | 0.0042 | 0.0042 |  |
| (f-2) | p-Methoxyphenol |  | 0.0084 | 0.0084 |  |  | 0.0084 |  |  |  |
|  | Total |  | 100.0 | 100.0 | 100.0 | 100.2 | 100.0 | 100.0 | 100.0 |  |
| HS: | Number of SH group in (A) mmol |  | 12.5 | 9.6 | 29.5 | 7.1 | 11.6 | 21.8 | 34.0 |  |
| ViB1: | Number of Vinyl group in (B1) mmol |  | 9.1 | 7.6 | 30.3 | 2.4 | 12.4 | 7.2 | 6.0 |  |
| ViB2: | Number of Vinyl group in (B2) mmol |  | 0.0 | 0.0 | 0.0 | 0.0 | 0.0 | 0.0 | 0.0 |  |
| ViB: | Number of Vinyl groups in (B1) and (B2) mmol |  | 9.1 | 7.6 | 30.3 | 2.4 | 12.4 | 7.2 | 6.0 |  |
| Ratio (%) of vinyl groups in (B) based on vinyl groups in (B2) |  |  | 0.0 | 0.0 | 0.0 | 0.0 | 0.0 | 0.0 | 0.0 |  |
| ViD: | Number of Vinyl group in (D) mmol |  | 5.2 | 5.2 | 10.1 | 4.6 | 5.1 | 5.1 | 5.1 |  |
| ViB + ViD: | Number of Vinyl groups in (B) and (D) mmol |  | 14.3 | 12.8 | 40.4 | 7.0 | 17.5 | 12.3 | 11.1 |  |
| HS/(ViB + ViD) |  |  | 0.88 | 0.75 | 0.73 | 1.02 | 0.66 | 1.77 | 3.05 |  |
| HS/ViD |  |  | 2.41 | 1.85 | 2.93 | 1.55 | 2.27 | 4.26 | 6.63 |  |
| HS/ViB |  |  | 1.38 | 1.27 | 0.97 | 2.93 | 0.94 | 3.03 | 5.64 |  |

TABLE 4

|  |  | Example 3 | Example 4 | Example 5 | Example 6 | Comparative example 4 | Comparative example 5 | Comparative example 6 | Comparative example 7 |
|---|---|---|---|---|---|---|---|---|---|
| Viscosity of composition | cP/23° C. | 2330 | 2650 | 3760 | 6980 | 980 | 2230 | 2120 | 3430 |
| Visible light transmittance % after curing |  | 99.2 | 98.1 | 97.6 | 98.4 | 98.2 | 98.1 | 96.8 | 97.4 |
| Cure shrinkage % |  | 0.17 | 0.20 | 0.19 | 0.13 | 0.13 | 0.39 | 0.44 | 2.62 |
| E hardness after curing |  | 24 | 10 | 24 | 10 | 4 | 44 | 54 | 15 |
| Elongation after curing | 2 mm-thick × 3 3000 mJ | 130 | 180 | 90 | 140 | 100 | 100 | 70 | 220 |
| Dot pressing test | 10 kgf | ○ | ○ | ○ | ○ | ○ | X | X | ○ |
|  | 20 kgf | ○ | ○ | ○ | ○ | ○ | — | — | X |
|  | 30 kgf | ○ | ○ | ○ | ○ | X | — | — | — |
|  | 40 kgf | ○ | ○ | ○ | ○ | — | — | — | — |
|  | 50 kgf | ○ | ○ | ○ | ○ | — | — | — | — |
| Storage modulus G' after curing | G'(−50)/G'(23) | 0.86 | 0.92 | 1.09 | 0.43 | 0.77 | 0.80 | 0.75 | 1125 |
|  | G'(100)/G'(23) | 1.80 | 1.60 | 1.30 | 0.78 | 1.98 | 2.06 | 1.88 | 0.2 |
| Loss modulus G" after curing | G"(−50)/G"(23) | 2.80 | 2.50 | 4.50 | 1.55 | 2.78 | 3.32 | 3.30 | 1487.0 |
|  | G"(100)/G"(23) | 0.84 | 0.92 | 0.55 | 0.55 | 0.88 | 0.95 | 1.28 | 0.02 |
| Crack resistance and change in color | Heat shock | OK | OK | OK | OK | OK | NG*1 | NG*5 | NG |
|  | Under high temperature and high humidity | OK | OK | OK | OK | OK | OK | NG*1 | NG |
| Cohesive failure rate % adherend acryl | Immediately after irradiation of UV ray | 100 | 100 | 100 | 100 | 0 | 0 | 0 | 0 |
|  | after 1 day | 100 | 100 | 100 | 100 | 40 | 10 | 5 | 0 |
|  | after 3 days | 100 | 100 | 100 | 100 | 60 | 30 | 10 | 0 |
| Cohesive failure rate % adherend glass | Immediately after irradiation of UV ray | 100 | 100 | 100 | 100 | 0 | 0 | 0 | 90 |
|  | after 1 day | 100 | 100 | 100 | 100 | 100 | 40 | 20 | 90 |
|  | after 3 days | 100 | 100 | 100 | 100 | 100 | 80 | 40 | 90 |
| Cohesive failure rate % with polarizing plate | Untreated | 35 | 40 | 50 | 15 | 0 | 0 | 0 | 0.0 |
|  | Anti-reflection coat | 75 | 90 | 80 | 100 | 30 | 5 | 0 | 15.0 |
|  | Hard coat | 95 | 100 | 100 | 100 | 40 | 30 | 10 | 40.0 |

TABLE 4-continued

|  |  | Example 3 | Example 4 | Example 5 | Example 6 | Comparative example 4 | Comparative example 5 | Comparative example 6 | Comparative example 7 |
|---|---|---|---|---|---|---|---|---|---|
| Fogging | Under high temperature and high humidity | 0.35 | 0.49 | 0.42 | 0.50 | 0.58 | 0.44 | 0.41 | 1.1 |
| Color change at high temperature | Yellow Index | 0.34 | 0.48 | 0.49 | 0.42 | 0.50 | 0.79 | 0.88 | 1.79 |
| Coating property (wetting property with a part) |  | ○ | ○ | ○ | Δ-○ | ○ | ○ | ○ | X |

In the table, *1 to *5 are the situation as follows.
*1 Fine cracks generated at 5 portions.
*2. Fine cracks generated at 1 portion.
*3: Cracks generated markedly.
*4: Fogging generated at whole surface.
*5 Fine crack generated at sealing portion and pealing generated at edge surface.

From Tables 3 and 4, it can be understood that as shown in Examples 3 to 6, even if the combination of the mercaptopropyl group-containing polymethylsiloxane and the vinyl-terminated polymethylphenylsiloxane having different viscosities is used, when HS/(ViB+ViD) and HS/ViB are within the scope of the present invention, they are liquid state and excellent in coating property, and the transmittance of the cured product is excellent. In addition, it can be also understood that the shrinkage ratio at the time of curing is suppressed, both of the hardness and elongation of the cured product are suitable, further, the temperature change can be suppressed with regard to the modulus of elasticity of the cured product, and adhesiveness is also good.

On the other hand, Comparative example 4 in which HS/ViB is out of the scope of the present invention was inferior in adhesiveness. Also, it can be understood that in Comparative examples 5 to 6 in which both of HS/(ViB+ViD), HS/ViD and HS/ViB are out of the scope of the present invention, hardness is larger and elongation is smaller with regard to the cured products. Also, it can be understood that crack or peeling are generated by the heat shock, and they are inferior in adhesiveness as well.

It can be understood that according to evaluation of physical property of Comparative example 7 which uses a resin corresponding to the commercially available ultraviolet-curable acrylic resin, the results are far inferior to those of Examples.

Example 7

In 5 L of an almighty mixing stirrer (manufactured by Dalton Co., Ltd.) were charged 11.8 parts by weight (118 g) of mercaptopropyl group-containing polymethylsiloxane (a-3), 44.1 parts by weight (441 g) of vinyl-terminated polymethylphenylsiloxane (b1-2) of synthetic example and 42.4 parts by weight (424 g) of MQ resin (e-1), and the mixture was uniformly mixed at room temperature (22° C.) under the rotation conditions of a low-speed lever for 30 minutes. After mixing uniformly, a dissolved mixture comprising 0.0042 parts by weight (0.042 g) of p-t-butylcatechol (f-1), 0.21 parts by weight (2.1 g) of 2-hydroxy-2-methylpropiophenone (c-1) and 0.21 parts by weight (2.1 g) of 2,2-dimethoxy-1,2-diphenylethan-1-one (c-2), and 1.00 part by weight (10.00 g) of 3-methacryloxypropyltrimethoxysilane (d-1) were further added to the mixture, and the resulting mixture was uniformly mixed under ice-water cooling (8° C.) under the rotation conditions of a low-speed lever for 30 minutes under cooling and reduced pressure. Thereafter, extraneous substances, etc., were removed by a membrane filter with 10 μm to obtain a composition.

In the same manner as in Example 7, according to the formulations shown in Table 5, Examples 8 to 10 and Comparative examples 8 to 10 were prepared and their physical properties were evaluated. The results are shown in Table 6.

TABLE 5

|  |  |  | Comparative example 8 | Comparative example 9 | Example 7 | Comparative example 10 | Example 8 | Example 9 | Example 10 |
|---|---|---|---|---|---|---|---|---|---|
| (a-1) | Mercaptopropyl group-containing polymethylsiloxane | (294 cP) |  |  |  |  |  |  |  |
| (a-2) | Mercaptopropyl group-containing polymethylsiloxane | (110 cP) |  |  |  |  |  |  |  |
| (a-3) | Mercaptopropyl group-containing polymethylsiloxane | (220 cP) |  |  | 11.8 |  |  |  |  |
| (a-4) | Mercaptopropyl group-containing polymethylsiloxane | (330 cP) | 6.0 | 6.8 |  | 7.8 | 12.4 | 10.9 |  |
| (a-5) | Mercaptopropyl group-containing polymethylsiloxane | (23000 cP) |  |  |  |  |  |  |  |
| (a-6) | Mercaptopropyl group-containing polymethylsiloxane | (60 cP) |  |  |  |  |  |  | 3.0 |
| (b1-1) | Vinyl-terminated polymethylphenylsiloxane | (3200 cP) |  |  |  |  |  | 41.3 | 40.0 |
| (b1-2) | Vinyl-terminated polymethylphenylsiloxane | (1020 cP) | 50.0 | 49.3 | 44.1 | 49.2 | 65.3 | 23.5 | 33.6 |
| (b1-3) | Vinyl-terminated polymethylphenylsiloxane | (9020 cP) |  |  |  |  |  |  |  |
| (b1-4) | Vinyl-terminated polymethylphenylsiloxane | (18900 cP) |  |  |  |  | 1.85 | 1.85 |  |
| (b1-5) | Vinyl-terminated polymethylphenylsiloxane | (20450 cP) |  |  |  |  |  |  |  |
| (b1-6) | Vinyl-terminated polymethylphenylsiloxane | (2070 cP) |  |  |  |  |  |  |  |
| (c-1) | 2-Hydroxy-2-methylpropiophenone |  | 0.21 | 0.21 | 0.21 | 0.21 | 0.21 | 0.21 | 0.21 |
| (c-2) | 2,2-Dimethoxy-1,2-diphenylethane-1-one |  | 0.21 | 0.21 | 0.21 | 0.21 | 0.21 | 0.21 | 0.21 |

TABLE 5-continued

|  |  | Comparative example 8 | Comparative example 9 | Example 7 | Comparative example 10 | Example 8 | Example 9 | Example 10 |
|---|---|---|---|---|---|---|---|---|
| (d-1) | 3-Methacryloxypropyltrimethoxysilane | 1.27 | 1.27 | 1.00 | 1.27 | 1.27 | 1.27 | 1.27 |
| (e-1) | MQresin | 43.3 | 42.2 | 42.4 | 40.0 | 18.7 | 20.7 | 20.7 |
| (f-1) | p-t-Butylcatechol | 0.0042 | 0.0042 | 0.0042 | 0.0042 | 0.0042 | 0.0042 | 0.0042 |
| (f-2) | p-Methoxyphenol | 0.0084 | 0.0084 | 0.0084 | 0.0084 | 0.0084 | 0.0084 | 0.0084 |
|  | Total | 100.0 | 100.0 | 99.7 | 98.7 | 100.0 | 100.0 | 99.0 |
| HS: | Number of SH group in (A) mmol | 5.8 | 6.6 | 6.1 | 7.6 | 12.0 | 10.6 | 13.8 |
| ViB1: | Number of Vinyl group in (B1) mmol | 7.2 | 7.1 | 6.3 | 7.1 | 9.4 | 7.3 | 8.6 |
| ViB2: | Number of Vinyl group in (B2) mmol | 0.0 | 0.0 | 0.0 | 0.0 | 0.0 | 0.0 | 0.0 |
| ViB: | Number of Vinyl groups in (B1) and (B2) mmol | 7.2 | 7.1 | 6.3 | 7.1 | 9.4 | 7.3 | 8.6 |
| Ratio (%) of vinyl groups in (B) based on vinyl groups in (B2) |  | 0.0 | 0.0 | 0.0 | 0.0 | 0.0 | 0.0 | 0.0 |
| ViD: | Number of Vinyl group in (D) mmol | 5.1 | 5.1 | 4.0 | 5.1 | 5.1 | 5.1 | 5.1 |
| ViB + ViD: | Number of Vinyl groups in (B) and (D) mmol | 12.3 | 12.2 | 10.4 | 12.2 | 14.5 | 12.5 | 13.7 |
| HS/(ViB + ViD) |  | 0.47 | 0.54 | 0.59 | 0.62 | 0.83 | 0.85 | 1.00 |
| HS/ViD |  | 1.14 | 1.29 | 1.52 | 1.48 | 2.35 | 2.07 | 2.70 |
| HS/ViB |  | 0.81 | 0.93 | 0.97 | 1.07 | 1.28 | 1.44 | 1.60 |

TABLE 6

|  |  | Comparative example 8 | Comparative example 9 | Example 7 | Comparative example 10 | Example 8 | Example 9 | Example 10 |
|---|---|---|---|---|---|---|---|---|
| Viscosity of composition | cP/23° C. | 5380 | 5580 | 5330 | 5230 | 3260 | 3980 | 1870 |
| Visible light transmittance % after curing |  | 98.1 | 98.3 | 98.4 | 98.2 | 98.4 | 98.2 | 99.1 |
| Cure shrinkage % |  | 0.22 | 0.12 | 0.18 | 0.14 | 0.15 | 0.13 | 0.23 |
| E hardness after curing |  | 0 | 1 | 5 | 3 | 12 | 13 | 22 |
| Elongation after curing | 2 mm-thick × 3 3000 mJ | -unable to measure | 50 | 190 | 90 | 190 | 200 | 100 |
| Dot pressing test | 10 kgf | X | X | ○ | ○ | ○ | ○ | ○ |
|  | 20 kgf | — | — | ○ | X | ○ | ○ | ○ |
|  | 30 kgf | — | — | ○ | — | ○ | ○ | ○ |
|  | 40 kgf | — | — | ○ | — | ○ | ○ | ○ |
|  | 50 kgf | — | — | ○ | — | ○ | ○ | ○ |
| Storage modulus G' after curing | G'(−50)/G'(23) | 3.45 | 3.30 | 9.00 | 3.10 | 4.00 | 3.40 | 3.87 |
|  | G'(100)/G'(23) | 0.58 | 0.47 | 1.17 | 0.52 | 0.45 | 0.51 | 0.57 |
| Loss modulus after curing | G''(−50)/G''(23) | 19.45 | 18.40 | 68.00 | 17.34 | 22.00 | 20.60 | 24.65 |
|  | G''(100)/G''(23) | 0.42 | 0.30 | 0.14 | 0.34 | 0.25 | 0.31 | 0.38 |
| Crack resistance and | Heat shock | OK | OK | OK | OK | OK | OK | OK |
| change in color | Under high temperature and high humidity | NG*4 | NG*4 | OK | NG*4 | OK | OK | OK |
| Cohesive failure rate % | Immediately after irradiation of UV ray | 100 | 100 | 100 | 100 | 100 | 100 | 0 |
| adherend |  |  |  |  |  |  |  |  |
| acryl | after 1 day | 100 | 100 | 100 | 100 | 100 | 100 | 100 |
|  | after 3 days | 100 | 100 | 100 | 100 | 100 | 100 | 100 |
| Cohesive failure rate % | Immediately after irradiation of UV ray | 100 | 100 | 100 | 100 | 100 | 100 | 100 |
| adherend |  |  |  |  |  |  |  |  |
| glass | after 1 day | 100 | 100 | 100 | 100 | 100 | 100 | 60 |
|  | after 3 days | 100 | 100 | 100 | 100 | 100 | 100 | 100 |
| Cohesive failure rate % | Untreated | 100 | 100 | 100 | 100 | 100 | 100 | 0 |
| with polarizing plate | Anti-reflection coat | 100 | 100 | 100 | 100 | 100 | 100 | 40 |
|  | Hard coat | 100 | 100 | 100 | 100 | 100 | 100 | 90 |
| Fogging | Under high temperature and high humidity | 1.23 | 0.78 | 0.50 | 0.67 | 0.40 | 0.43 | 0.46 |
| Color change at high temperature | Yellow Index | 0.66 | 0.55 | 0.44 | 0.62 | 0.40 | 0.38 | 0.41 |
| Coating property (wetting property with a part) |  | ○ | ○ | ○ | ○ | ○ | ○ | ○ |

In the table, *1 to *5 are the situation as follows.
*1: Fine cracks generated at 5 portions.
*2: Fine cracks generated at 1 portion.
*3: Cracks generated markedly.
*4 Fogging generated at whole surface.
*5: Fine crack generated at sealing portion and pealing generated at edge surface.

Examples 7 to 10 and Comparative examples 8 to 10 in Tables 5 and 6 are compositions in which the MQ resin had been formulated for adjusting the hardness of the cured product. It can be understood that Examples 7 to 10 are liquid state, excellent in coating property, and the transmittance of the cured product is excellent. In addition, it can be also understood that the shrinkage ratio at the time of curing is suppressed, elongation of the cured product is each suitable, further, the temperature change is suppressed with regard to the modulus of elasticity of the cured product, and adhesiveness is also good. Moreover, by being formulated the MQ resin, adhesiveness to the polarizing plate, etc., is also improved.

On the other hand, in Comparative examples 8 to 10 in which at least one of HS/(ViB+ViD), HS/ViD and HS/ViB is out of the scope of the present invention, it can be understood that they are inferior in the point of elongation of the cured product as compared with those of Examples, and fogging was generated at the whole surface under high temperature and high humidity.

Example 11

In 5 L of an almighty mixing stirrer (manufactured by Dalton Co., Ltd.) were charged 10.2 parts by weight (102 g) of mercaptopropyl group-containing polymethylsiloxane (a-4), 44.1 parts by weight (441 g) of vinyl-terminated polymethylphenylsiloxane (b1-2) of synthetic example, 3.7 parts by weight (37 g) of vinyl-terminated polymethylphenylsiloxane (b1-4), 2.4 parts by weight (24 g) of $M_6D^YQ_8$ resin (112-1) and 40.6 parts by weight (406 g) of MQ resin (e-1), and the mixture was uniformly mixed at room temperature (22° C.) under the rotation conditions of a low-speed lever for 30 minutes. After mixing uniformly, a dissolved mixture comprising 0.0042 parts by weight (0.042 g) of p-t-butylcatechol (f-1), 0.21 parts by weight (2.1 g) of 2-hydroxy-2-methylpropiophenone (e-1) and 0.21 parts by weight (2.1 g) of 2,2-dimethoxy-1,2-diphenylethan-1-one (c-2), and 1.27 parts by weight (12.7 g) of 3-methacryloxypropyltrimethoxysilane (d-1) were further added to the mixture, and the resulting mixture was uniformly mixed under ice-water cooling (8° C.) under the rotation conditions of a low-speed lever for 30 minutes under cooling and reduced pressure. Thereafter, extraneous substances, etc., were removed by a membrane filter with 10 μm to obtain a composition.

In the same manner as in Example 11, according to the formulations shown in Table 7, Examples 12 to 14 and Comparative example 11 were prepared and their physical properties were evaluated. The results are shown in Table 8.

TABLE 7

| | | | Example 11 | Example 12 | Example 13 | Example 14 | Comparative example 11 |
|---|---|---|---|---|---|---|---|
| (a-1) | Mercaptopropyl group-containing polymethylsiloxane | (294 cP) | | | | | |
| (a-2) | Mercaptopropyl group-containing polymethylsiloxane | (110 cP) | | | | | |
| (a-3) | Mercaptopropyl group-containing polymethylsiloxane | (220 cP) | | | | | |
| (a-4) | Mercaptopropyl group-containing polymethylsiloxane | (330 cP) | 10.2 | 12.4 | 10.9 | 8.6 | 9.6 |
| (a-5) | Mercaptopropyl group-containing polymethylsiloxane | (23000 cP) | | | | | |
| (a-6) | Mercaptopropyl group-containing polymethylsiloxane | (60 cP) | | | | | |
| (b1-1) | Vinyl-terminated polymethylphenylsiloxane | (3200 cP) | | | 41.3 | | |
| (b1-2) | Vinyl-terminated polymethylphenylsiloxane | (1020 cP) | 41.4 | 63.6 | 22.3 | 44.2 | 63.6 |
| (b1-3) | Vinyl-terminated polymethylphenylsiloxane | (9020 cP) | | | | | |
| (b1-4) | Vinyl-terminated polymethylphenylsiloxane | (18900 cP) | 3.70 | 1.85 | 1.85 | | 2.60 |
| (b1-5) | Vinyl-terminated polymethylphenylsiloxane | (20450 cP) | | | | | |
| (b1-6) | Vinyl-terminated polymethylphenylsiloxane | (2070 cP) | | | | | |
| (b2-1) | $M_6D^YQ_8$ resin | | 2.40 | 1.24 | 1.24 | 1.24 | 1.24 |
| (c-1) | 2-Hydroxy-2-methylpropiophenone | | 0.21 | 0.21 | 0.21 | 0.21 | 0.21 |
| (c-2) | 2,2-Dimethoxy-1,2-diphenylethane-1-one | | 0.21 | 0.21 | 0.21 | 0.21 | 0.21 |
| (d-1) | 3-Methacryloxypropyltrimethoxysilane | | 1.27 | 1.27 | 1.27 | 1.28 | 1.77 |
| (e-1) | MQ resin | | 40.6 | 19.2 | 20.7 | 44.2 | 20.7 |
| (f-1) | p-t-Butylcatechol | | 0.0042 | 0.0042 | 0.0042 | 0.0042 | 0.0042 |
| (f-2) | p-Methoxyphenol | | 0.0084 | 0.0084 | 0.0084 | 0.0084 | 0.0084 |
| | Total | | 100.0 | 100.0 | 100.0 | 100.0 | 100.0 |
| HS: | Number of SH group in (A) mmol | | 9.9 | 12.0 | 10.6 | 8.3 | 9.3 |
| ViB1: | Number of Vinyl group in (B1) mmol | | 6.1 | 9.2 | 7.2 | 6.4 | 9.3 |
| ViB2: | Number of Vinyl group in (B2) mmol | | 2.4 | 1.2 | 1.2 | 1.2 | 1.2 |
| ViB: | Number of Vinyl groups in (B1) and (B2) mmol | | 8.5 | 10.5 | 8.5 | 7.6 | 10.5 |
| Ratio (%) of vinyl groups in (B) based on vinyl groups in (B2) | | | 28.4 | 11.9 | 14.8 | 16.4 | 11.9 |
| ViD: | Number of Vinyl group in (D) mmol | | 5.1 | 5.1 | 5.1 | 5.2 | 7.1 |
| ViB + ViD: | Number of Vinyl group in (B) and (D) mmol | | 13.6 | 15.6 | 13.6 | 12.8 | 17.6 |
| HS/(ViB + ViD) | | | 0.73 | 0.77 | 0.78 | 0.65 | 0.53 |
| HS/ViD | | | 1.93 | 2.35 | 2.07 | 1.62 | 1.31 |
| HS/ViB | | | 1.16 | 1.15 | 1.25 | 1.10 | 0.89 |

TABLE 8

| | | Example 11 | Example 12 | Example 13 | Example 14 | Comparative example 11 |
|---|---|---|---|---|---|---|
| Viscosity of composition | cP/23° C. | 5890 | 3440 | 4230 | 6320 | 3740 |
| Visible light transmittance % after curing | | 98.1 | 98.5 | 98.4 | 98.0 | 98.2 |
| Cure shrinkage % | | 0.13 | 0.14 | 0.11 | 0.12 | 1.09 |
| E hardness after curing | | 12 | 14 | 16 | 8 | 3 |
| Elongation after curing | 2 mm-thick × 3 3000 mJ | 230 | 200 | 220 | 250 | 300 |
| Dot pressing test | 10 kgf | ○ | ○ | ○ | ○ | ○ |
| | 20 kgf | ○ | ○ | ○ | ○ | X |
| | 30 kgf | ○ | ○ | ○ | ○ | — |

TABLE 8-continued

|  |  | Example 11 | Example 12 | Example 13 | Example 14 | Comparative example 11 |
|---|---|---|---|---|---|---|
|  | 40 kgf | ○ | ○ | ○ | ○ | — |
|  | 50 kgf | ○ | ○ | ○ | ○ | — |
| Storage modulus G' after curing | G'(−50)/G'(23) | 9.00 | 4.20 | 3.80 | 9.40 | 9.97 |
|  | G'(100)/G'(23) | 1.20 | 0.50 | 0.60 | 1.13 | 2.10 |
| Loss modulus after curing | G"(−50)/G"(23) | 68.00 | 27.00 | 23.00 | 73.00 | 89.00 |
|  | G"(100)/G"(23) | 0.16 | 0.30 | 0.35 | 0.14 | 0.10 |
| Crack resistance and change in color | Heat shock | OK | OK | OK | OK | OK |
|  | Under high temperature and high humidity | OK | OK | OK | OK | NG*3 |
| Cohesive failure rate % adherend acryl | Immediately after irradiation of UV ray | 100 | 100 | 100 | 100 | 100 |
|  | after 1 day | 100 | 100 | 100 | 100 | 100 |
|  | after 3 days | 100 | 100 | 100 | 100 | 100 |
| Cohesive failure rate % adherend glass | Immediately after irradiation of UV ray | 100 | 100 | 100 | 100 | 100 |
|  | after 1 day | 100 | 100 | 100 | 100 | 100 |
|  | after 3 days | 100 | 100 | 100 | 100 | 100 |
| Cohesive failure rate % with polarizing plate | Untreated | 100 | 100 | 100 | 100 | 0 |
|  | Anti-reflection coat | 100 | 100 | 100 | 100 | 100 |
|  | Hard coat | 100 | 100 | 100 | 100 | 20 |
| Fogging | Under high temperature and high humidity | 0.41 | 0.38 | 0.41 | 0.44 | 5.44 |
| Color change at high temperature | Yellow Index | 0.46 | 0.41 | 0.39 | 0.48 | 0.49 |
| Coating property (wetting property with a part) |  | ○ | ○ | ○ | ○ | ○ |

In the table, *1 to *5 are the situation as follows.
*1: Fine cracks generated at 5 portions.
*2: Fine cracks generated at 1 portion.
*3Cracks generated markedly.
*4: Fogging generated at whole surface.
*5: Fine crack generated at sealing portion and pealing generated at edge surface.

Examples 11 to 14 and Comparative example 11 in Tables 7 and 8 are compositions in which the branched polyorganosiloxane having an aliphatic unsaturated group is used in combination, and the MQ resin is formulated. In Examples 11 to 14, they are good in the coating property, transmittance of the cured product, shrinkage ratio and elongation at the time of curing, and temperature change with regard to the modulus of elasticity of the cured product, and further improvement in adhesiveness can be accomplished.

On the other hand, in Comparative example 11 in which HS/(ViB+ViD) and HS/ViD are out of the scope of the present invention, cracks are generated under high temperature and high humidity, and improvement in adhesiveness is inferior to those of Examples.

Example 15

In 5 L of an almighty mixing stirrer (manufactured by Dalton Co., Ltd.) were charged 9.5 parts by weight (95 g) of mercaptopropyl group-containing polymethylsiloxane (a-4), 66.12 parts by weight (661.2 g) of vinyl-terminated polymethylphenylsiloxane (b1-1) of synthetic example, 21.7 parts by weight (217 g) of vinyl-terminated polymethylphenylsiloxane (b1-4) and 0.8 parts by weight (8 g) of $M_6D^vQ_8$ resin (b2-1), and the mixture was uniformly mixed at room temperature (22° C.) under the rotation conditions of a low-speed lever for 30 minutes. After mixing uniformly, a dissolved mixture comprising 0.04 parts by weight (0.4 g) of p-t-butylcatechol (f-1), 0.22 parts by weight (2.2 g) of 2-hydroxy-2-methylpropiophenone (c-1), 0.22 parts by weight (2.2 g) of 2,2-dimethoxy-1,2-diphenylethan-1-one (c-2), and 1.3 parts by weight (13 g) of 3-methacryloxypropyltrimethoxysilane (d-1) were further added to the mixture, and the resulting mixture was uniformly mixed under ice-water cooling (8° C.) under the rotation conditions of low-speed level for 30 minutes under cooling and reduced pressure. Thereafter, extraneous substances, etc., were removed by a membrane filter with 10 μm to obtain a composition.

In the same manner as in Example 15, according to the formulations shown in Table 9, Examples 16 to 18 and Comparative examples 12 and 13 were prepared and their physical properties were evaluated. The results are shown in Table 10.

TABLE 9

|  |  |  | Example 15 | Example 16 | Example 17 | Example 18 | Comparative example 12 | Comparative example 13 |
|---|---|---|---|---|---|---|---|---|
| (a-1) | Mercaptopropyl group-containing polymethylsiloxane | (294 cP) |  |  |  |  |  |  |
| (a-2) | Mercaptopropyl group-containing polymethylsiloxane | (110 cP) |  |  |  |  |  |  |
| (a-3) | Mercaptopropyl group-containing polymethylsiloxane | (220 cP) |  |  |  | 7 |  |  |
| (a-4) | Mercaptopropyl group-containing polymethylsiloxane | (330 cP) | 9.50 | 11.00 | 13.10 |  | 13.50 | 14.50 |
| (a-5) | Mercaptopropyl group-containing polymethylsiloxane | (23000 cP) |  |  |  |  |  |  |
| (a-6) | Mercaptopropyl group-containing polymethylsiloxane | (60 cP) |  |  |  |  |  |  |
| (b1-1) | Vinyl-terminated polymethylphenylsiloxane | (3200 cP) | 66.12 | 63.65 | 42.54 |  | 9 | 8 |
| (b1-2) | Vinyl-terminated polymethylphenylsiloxane | (1020 cP) |  |  |  |  | 2.04 | 2.4 |
| (b1-3) | Vinyl-terminated polymethylphenylsiloxane | (9020 cP) |  |  |  |  |  |  |
| (b1-4) | Vinyl-terminated polymethylphenylsiloxane | (18900 cP) | 21.7 | 21.15 | 38.25 | 91.3 | 68.25 | 67.17 |
| (b1-5) | Vinyl-terminated polymethylphenylsiloxane | (20450 cP) |  |  |  |  |  |  |
| (b1-6) | Vinyl-terminated polymethylphenylsiloxane | (2070 cP) |  |  |  |  |  |  |
| (b2-1) | $M_6D^rQ_8$ resin |  | 0.8 | 2.35 | 4.26 | 1 | 5.63 | 6.35 |

TABLE 9-continued

|  |  | Example 15 | Example 16 | Example 17 | Example 18 | Comparative example 12 | Comparative example 13 |
|---|---|---|---|---|---|---|---|
| (c-1) | 2-Hydroxy-2-methylpropiophenone | 0.22 | 0.22 | 0.22 | 0.22 | 0.22 | 0.22 |
| (c-2) | 2,2-Dimethoxy-1,2-diphenylethane-1-one | 0.22 | 0.22 | 0.22 | 0.22 | 0.22 | 0.22 |
| (d-1) | 3-Methacryloxypropyltrimethoxysilane | 1.3 | 1.27 | 1.27 | 1.13 | 1 | 1 |
| (e-1) | MQresin |  |  |  |  |  |  |
| (f-1) | p-t-Butylcatechol | 0.04 | 0.04 | 0.04 | 0.0042 | 0.04 | 0.04 |
| (f-2) | p-Methoxyphenol |  |  |  |  |  |  |
|  | F-250 1MST | 0.1 | 0.1 | 0.1 |  | 0.1 | 0.1 |
|  | Total | 100.0 | 100.0 | 100.0 | 100.9 | 100.0 | 100.0 |
| HS: | Number of SH group in (A) mmol | 9.2 | 10.7 | 12.7 | 6.9 | 13.1 | 14.1 |
| ViB1: | Number of Vinyl group in (B1) mmol | 7.2 | 6.9 | 5.6 | 3.7 | 4.0 | 3.9 |
| ViB2: | Number of Vinyl group in (B2) mmol | 0.8 | 2.4 | 4.3 | 1.0 | 5.7 | 6.4 |
| ViB: | Number of Vinyl groups in (B1) and (B2) mmol | 8.0 | 9.3 | 9.9 | 4.8 | 9.6 | 10.3 |
| Ratio (%) of vinyl groups in (B) based on vinyl groups in (B2) | | 10.1 | 25.5 | 43.3 | 21.2 | 58.9 | 62.3 |
| ViD: | Number of Vinyl group in (D) mmol | 5.2 | 5.1 | 5.1 | 4.6 | 4.0 | 4.0 |
| ViB + ViD: | Number of Vinyl groups in (B) and (D) mmol | 13.2 | 14.4 | 15.0 | 9.3 | 13.7 | 14.3 |
| HS/(ViB + ViD) | | 0.70 | 0.74 | 0.85 | 0.74 | 0.96 | 0.98 |
| HS/ViD | | 1.76 | 2.08 | 2.48 | 1.51 | 3.25 | 3.49 |
| HS/ViB | | 1.15 | 1.15 | 1.28 | 1.44 | 1.36 | 1.37 |

TABLE 10

|  |  | Example 15 | Example 16 | Example 17 | Example 18 | Comparative example 12 | Comparative example 13 |
|---|---|---|---|---|---|---|---|
| Viscosity of composition | cP/23° C. | 4230 | 4080 | 4880 | 12640 | 10400 | 9880 |
| Visible light transmittance % after curing | | 98.7 | 98.5 | 98.3 | 98.7 | 98.2 | 98.0 |
| Cure shrinkage % | | 0.18 | 0.19 | 0.19 | 0.11 | 0.2 | 0.21 |
| E hardness after curing | | 7 | 22 | 37 | 8 | 42 | 47 |
| Elongation after curing | 2 mm-thick × 3 3000 mJ | 190 | 260 | 280 | 280 | 300 | 310 |
| Dot pressing test | 10 kgf | ○ | ○ | ○- | ○ | ○- | X- |
|  | 20 kgf | ○ | ○ | ○- | ○ | X- | X- |
|  | 30 kgf | ○ | ○ | ○- | ○ | — | — |
|  | 40 kgf | ○ | ○ | ○- | ○ | — | — |
|  | 50 kgf | ○ | ○ | ○- | ○ | — | — |
| Storage modulus G' after curing | G'(−50)/G'(23) | 0.91 | 1.01 | 1.21 | 0.45 | 1.33 | 1.89 |
|  | G'(100)/G'(23) | 2.7 | 3.3 | 3.6 | 1.10 | 3.9 | 4.2 |
| Loss modulus after curing | G"(−50)/G"(23) | 5.3 | 7.2 | 8.6 | 2.30 | 9.3 | 10.1 |
|  | G"(100)/G"(23) | 0.54 | 0.49 | 0.45 | 0.78 | 0.43 | 0.41 |
| Crack resistance and change in color | Heat shock | OK | OK | OK | OK | NG*2 | NG*1 |
|  | Under high temperature and high humidity | OK | OK | OK | OK | OK | OK |
| Cohesive failure rate % adherend acryl | Immediately after irradiation of UV ray | 100 | 100 | 100 | 100 | 100 | 100 |
|  | after 1 day | 100 | 100 | 100 | 100 | 100 | 100 |
|  | after 3 days | 100 | 100 | 100 | 100 | 100 | 100 |
| Cohesive failure rate % adherend glass | Immediately after irradiation of UV ray | 100 | 100 | 100 | 100 | 100 | 100 |
|  | after 1 day | 100 | 100 | 100 | 100 | 100 | 100 |
|  | after 3 days | 100 | 100 | 100 | 100 | 100 | 100 |
| Cohesive failure rate % with polarizing plate | Untreated | 60 | 45 | 30 | 40 | 0 | 0 |
|  | Anti-reflection coat | 100 | 95 | 90 | 100 | 90 | 80 |
|  | Hard coat | 100 | 100 | 100 | 100 | 100 | 100 |
| Fogging | Under high temperature and high humidity | 0.31 | 0.36 | 0.35 | 0.51 | 0.37 | 0.39 |
| Color change at high temperature | Yellow Index | 0.37 | 0.39 | 0.39 | 0.41 | 0.4 | 0.42 |
| Coating property (wetting property with a part) | | ○ | ○ | ○ | Δ | Δ | Δ~○ |

In the table, *1 to *5 are the situation as follows.
*1 Fine cracks generated at 5 portions.
*2 Fine cracks generated at 1 portion.
*3: Cracks generated markedly.
*4. Fogging generated at whole surface.
*5: Fine crack generated at sealing portion and pealing generated at edge surface.

Examples 15 to 18 and Comparative examples 12 and 13 in Tables 9 and 10 are compositions in which the branched polyorganosiloxane having an aliphatic unsaturated group is used in combination. In Examples 15 to 18, they are good in coating property, transmittance of the cured product, shrinkage ratio and elongation at the time of curing, and temperature change with regard to the modulus of elasticity of the cured product, and further improvement in adhesiveness can be accomplished.

On the other hand, Comparative examples 12 and 13 in which the HS/ViD is out of the scope of the present invention had high E hardness of the cured product.

In the same manner as in Example 1, according to the formulations shown in Example 19 of Table 11, in the same manner as in Example 2, according to the formulations shown in Examples 20 to 22, and, in the same manner as in Example 7, according to the formulations shown in Examples 23 to 25, compositions were prepared and their physical properties were evaluated. The results are shown in Table 12.

TABLE 11

|  |  | Example 19 | Example 20 | Example 21 | Example 22 | Example 23 | Example 24 | Example 25 |
|---|---|---|---|---|---|---|---|---|
| (a1-1) | Mercaptopropyl group-containing polymethylsiloxane (294 cP) | 10.5 | 12.1 | 12.1 | 12.1 | | | |
| (a1-2) | Mercaptopropyl group-containing polymethylsiloxane (110 cP) | | | | | | | |
| (a1-3) | Mercaptopropyl group-containing polymethylsiloxane (220 cP) | | | | | 11.8 | 11.8 | 11.8 |
| (b1-1) | Vinyl-terminated polymethylphenylsiloxane (3200 cP) | 87.9 | 86.6 | 86.6 | 86.6 | | | |
| (b1-2) | Vinyl-terminated polymethylphenylsiloxane (1020 cP) | | | | | 44.1 | 44.1 | 44.1 |
| (b2-1) | M6Q8Dv iresin | | | | | | | |
| (c-1) | 2-Hydroxy-2-methylpropiophenone | 0.22 | 0.22 | 0.22 | 0.22 | 0.21 | 0.21 | 0.21 |
| (c-2) | 2,2-Dimethoxy-1,2-diphenylethane-1-one | | | | | | | |
| (c-3) | 1Hydroxy-cyclohexyl-phenyl-ketone | 0.22 | 0.27 | | | 0.27 | | |
| (c-4) | 2-methyl-1-[4-(methylthio)phenyl]-2-morpholinopropan-1-one | | | 0.24 | | | 0.24 | |
| (c-5) | 2-benzyl-2-dimethylamino-1-1-(4-morpholinofhenyl)-butanone | | | | 0.11 | | | 0.11 |
| (d-1) | 3-Methacryloxypropyltrimethoxysilane | 1.29 | 1.29 | 1.29 | 1.29 | 1.27 | 1.27 | 1.27 |
| (e-1) | MQresin | | | | | 42.4 | 42.4 | 42.4 |
| (f-1) | p-t-Butylcatechol | 0.009 | 0.0042 | 0.0042 | 0.0042 | 0.0042 | 0.0042 | 0.0042 |
| (f-2) | p-Methoxyphenol | | | | | 0.0084 | 0.0084 | 0.0084 |
|  | Total | 100.1 | 100.5 | 100.4 | 100.3 | 100.1 | 100.0 | 99.9 |
| HS: | Number of SH group in (A) mmol | 10.3 | 11.9 | 11.9 | 11.9 | 6.1 | 6.1 | 6.1 |
| ViB1: | Number of Vinyl group in (B1) mmol | 8.4 | 8.2 | 8.2 | 8.2 | 6.3 | 6.3 | 6.3 |
| ViB2: | Number of Vinyl group in (B2) mmol | 0.0 | 0.0 | 0.0 | 0.0 | 0.0 | 0.0 | 0.0 |
| ViB: | Number of Vinyl groups in (B1) and (B2) mmol | 8.4 | 8.2 | 8.2 | 8.2 | 6.3 | 6.3 | 6.3 |
| Ratio (%) of vinyl groups in (B) based on vinyl groups in (B2) | | 0.0 | 0.0 | 0.0 | 0.0 | 0.0 | 0.0 | 0.0 |
| ViD: | Number of Vinyl group in (D) mmol | 5.2 | 5.2 | 5.2 | 5.2 | 5.1 | 5.1 | 5.1 |
| ViB + ViD: | Number of Vinyl groups in (B) and (D) mmol | 13.6 | 13.4 | 13.4 | 13.4 | 11.5 | 11.5 | 11.5 |
| HS/(ViB + ViD) | | 0.76 | 0.88 | 0.88 | 0.88 | 0.54 | 0.54 | 0.54 |
| HS/ViD | | 1.98 | 2.28 | 2.28 | 2.28 | 1.20 | 1.20 | 1.20 |
| HS/ViB | | 1.23 | 1.44 | 1.44 | 1.44 | 0.97 | 0.97 | 0.97 |
| HS/ViB1 | | 1.23 | 1.44 | 1.44 | 1.44 | 0.97 | 0.97 | 0.97 |

TABLE 12

|  |  | Example 19 | Example 20 | Example 21 | Example 22 | Example 23 | Example 24 | Example 25 |
|---|---|---|---|---|---|---|---|---|
| Viscosity of composition | CP/23° C. | 3000 | 2750 | 2770 | 2740 | 5400 | 5350 | 5340 |
| Visible light transmittance % after curing | | 98.9 | 98.5 | 98.2 | 98.1 | 98.7 | 98.2 | 98.1 |
| Cure shrinkage % | | 0.19 | 0.17 | 0.18 | 0.17 | 0.16 | 0.17 | 0.19 |
| E hardness after curing | | 21 | 27 | 25 | 25 | 6 | 6 | 5 |
| Elongation after curing | 2 mm-thick × 3 3000 mJ | 140 | 120 | 130 | 130 | 200 | 170 | 170 |
| Dot pressing test | 10 kgf | ○ | ○ | ○ | ○ | ○ | ○ | ○ |
| | 20 kgf | ○ | ○ | ○ | ○ | ○ | ○ | ○ |
| | 30 kgf | ○ | ○ | ○ | ○ | ○ | ○ | ○ |
| | 40 kgf | ○ | ○ | ○ | ○ | ○ | ○ | ○ |
| | 50 kgf | ○ | ○ | ○ | ○ | ○ | ○ | ○ |
| Storage modulus G' after curing | G'(−50)/G'(23) | 0.67 | 0.86 | 0.87 | 0.90 | 8.70 | 9.10 | 9.00 |
| | G'(100)/G'(23) | 1.66 | 1.87 | 1.91 | 1.93 | 1.13 | 1.23 | 1.22 |
| Loss modulus after curing | G''(−50)/G''(23) | 2.45 | 2.85 | 2.92 | 2.96 | 65.00 | 70.00 | 69.00 |
| | G''(100)/G''(23) | 0.66 | 0.82 | 0.89 | 0.91 | 0.12 | 0.16 | 0.14 |
| Crack resistance and change in color | Heat shock | OK | OK | OK | OK | OK | OK | OK |
| | Under high temperature and high humidity | OK | OK | OK | OK | OK | OK | OK |
| Cohesive failure rate % adherend acryl | Immediately after irradiation of UV ray | 100 | 100 | 100 | 100 | 100 | 100 | 100 |
| | after 1 day | 100 | 100 | 100 | 100 | 100 | 100 | 100 |
| | after 3 days | 100 | 100 | 100 | 100 | 100 | 100 | 100 |
| Cohesive failure rate % adherend glass | Immediately after irradiation of UV ray | 100 | 100 | 100 | 100 | 100 | 100 | 100 |
| after 1 day | 100 | 100 | 100 | 100 | 100 | 100 | 100 | |
| | after 3 days | 100 | 100 | 100 | 100 | 100 | 100 | 100 |

TABLE 12-continued

|  |  | Example 19 | Example 20 | Example 21 | Example 22 | Example 23 | Example 24 | Example 25 |
|---|---|---|---|---|---|---|---|---|
| Cohesive failure rate % with polarizing plate | Untreated | 60 | 50 | 45 | 30 | 100 | 100 | 100 |
|  | Anti-reflection coat | 80 | 90 | 80 | 70 | 100 | 100 | 100 |
|  | Hard coat | 100 | 100 | 100 | 100 | 100 | 100 | 100 |
| Fogging | Under high temperature and high humidity | 0.33 | 0.39 | 0.45 | 0.46 | 0.44 | 0.49 | 0.49 |
| Color change at high temperature | Yellow Index | 0.42 | 0.41 | 0.49 | 0.49 | 0.39 | 0.46 | 0.48 |
| Coating property (wetting property with a part) |  | ◯ | ◯ | ◯ | ◯ | ◯ | ◯ | ◯ |

In the table, *1 to *5 are the situation as follows.
*1: Fine cracks generated at 5 portions.
*2: Fine cracks generated at 1 portion.
*3: Cracks generated markedly
*4: Fogging generated at whole surface.
*5: Fine crack generated at sealing portion and pealing generated at edge surface.

As shown in Examples 19 to 25 in Table 12, it can be understood that the compositions of the present invention are excellent in the viewpoints of coating property, transmittance of the cured product, shrinkage ratio and elongation at the time of curing, temperature change with regard to the modulus of elasticity of the cured product and adhesiveness even when various photoinitiators are used in combination.

In the same manner as in Example 2, according to the formulations shown in Examples 26 and 27 of Table 13, in the same manner as in Example 7, according to the formulation shown in Example 28, and, in the same manner as in Example 11, according to the formulation shown in Example 29, compositions were prepared and their physical properties were evaluated. Provided that a metal halide lamp (MHL-250) was used as a light source. The results are shown in Table 14.

TABLE 13

|  |  | Example 26 | Example 27 | Example 28 | Example 29 |
|---|---|---|---|---|---|
| (a1-1) | Mercaptopropyl group-containing polymethylsiloxane (294 cP) | 10.5 | 10.5 |  |  |
| (a1-2) | Mercaptopropyl group-containing polymethylsiloxane (110 cP) |  |  |  |  |
| (a1-3) | Mercaptopropyl group-containing polymethylsiloxime (220 cP) |  |  | 11.8 |  |
| (a1-4) | Mercaptopropyl group-containing polymethylsiloxane (330 cP) |  |  |  | 9.3 |
| (a1-5) | Mercaptopropyl group-containing polymethylsiloxane (23000 cP) |  |  |  |  |
| (a1-6) | Mercaptopropyl group-containing polymethylsiloxane (60 cP) |  |  |  |  |
| (b1-1) | Vinyl-terminated polymethylphenylsiloxane (3200 cP) | 87.8 | 87.8 |  |  |
| (b1-2) | Vinyl-terminated polymethylphenylsiloxane (1020 cP) |  |  | 44.1 | 41.42 |
| (b1-3) | Vinyl-terminated polymethylphenylsiloxane (9020 cP) |  |  |  |  |
| (b1-4) | Vinyl-terminated polymethylphenylsiloxane (18900 cP) |  |  |  | 3.7 |
| (b1-5) | Vinyl-terminated polymethylphenylsiloxane (20450 cP) |  |  |  |  |
| (b1-6) | Vinyl-terminated polymethylphenylsiloxane (2070 cP) |  |  |  |  |
| (b2-1) | M6Q8Dv iresin |  |  |  | 2.47 |
| (c-1) | 2-Hydroxy-2-methylpropiophenone | 0.22 | 0.20 | 0.21 | 0.21 |
| (c-2) | 2,2-Dimethoxy-1,2-diphenylethane-1-one | 0.22 | 0.30 | 0.21 | 0.21 |
| (d-1) | 3-Methacryloxypropyltrimethoxysilane | 1.27 | 1.27 | 1.00 | 1.27 |
| (e-1) | MQresin |  |  | 42.4 | 42.4 |
| (f-1) | p-t-Butylcatechol | 0.0042 | 0.0042 | 0.0042 | 0.0042 |
| (f-2) | p-Methoxyphenol |  |  | 0.0084 | 0.0084 |
|  | Total | 100.0 | 100.1 | 99.7 | 101.0 |
| HS: | Number of SH group in (A) mmol | 10.3 | 10.3 | 6.1 | 9.0 |
| ViB1: | Number of Vinyl group in (B1) mmol | 8.3 | 8.3 | 6.3 | 6.1 |
| ViB2: | Number of Vinyl group in (B2) mmol | 0.0 | 0.0 | 0.0 | 2.5 |
| ViB: | Number of Vinyl groups in (B1) and (B2) mmol | 8.3 | 8.3 | 6.3 | 8.6 |
| Ratio (%) of vinyl groups in (B) based on vinyl groups in (B2) | | 0.0 | 0.0 | 0.0 | 28.9 |
| ViD: | Number of Vinyl group in (D) mmol | 5.1 | 5.1 | 4.0 | 5.1 |
| ViB + ViD: | Number of Vinyl groups in (B) and (D) mmol | 13.5 | 13.5 | 10.4 | 13.7 |
| HS/(ViB + ViD) |  | 0.76 | 0.76 | 0.59 | 0.66 |
| HS/ViD |  | 2.01 | 2.01 | 1.52 | 1.76 |
| HS/ViB |  | 1.23 | 1.23 | 0.97 | 1.05 |
| HS/ViB1 |  | 1.23 | 1.23 | 0.97 | 1.48 |

TABLE 14

|  |  | Example 26 | Example 27 | Example 28 | Example 29 |
|---|---|---|---|---|---|
| Viscosity of composition | cP/23° C. | 3050 | 3060 | 5300 | 5890 |
| Visible light transmittance % after curing |  | 98.5 | 98.3 | 98.5 | 98.6 |
| Cure shrinkage % |  | 0.18 | 0.17 | 0.17 | 0.17 |
| E hardness after curing |  | 21 | 21 | 5 | 11 |
| Elongation after curing | 2 mm-thick × 3 3000 mJ | 150 | 150 | 210 | 250 |

TABLE 14-continued

|  |  | Example 26 | Example 27 | Example 28 | Example 29 |
|---|---|---|---|---|---|
| Dot pressing test | 10 kgf | ○ | ○ | ○ | ○ |
|  | 20 kgf | ○ | ○ | ○ | ○ |
|  | 30 kgf | ○ | ○ | ○ | ○ |
|  | 40 kgf | ○ | ○ | ○ | ○ |
|  | 50 kgf | ○ | ○ | ○ | ○ |
| Storage modulus G' after curing | G'(−50)/G'(23) | 0.67 | 0.68 | 8.76 | 8.88 |
|  | G'(100)/G'(23) | 1.68 | 1.67 | 1.06 | 1.22 |
| Loss modulus after curing | G"(−50)/G"(23) | 2.50 | 2.46 | 63.00 | 64.00 |
|  | G"(100)/G"(23) | 0.66 | 0.67 | 0.13 | 0.15 |
| Crack resistance and change in color | Heat shock | OK | OK | OK | OK |
|  | Under high temperature and high humidity | OK | OK | OK | OK |
| Cohesive failure rate % adherend acryl | Immediately after irradiation of UV ray | 100 | 100 | 100 | 100 |
|  | after 1 day | 100 | 100 | 100 | 100 |
|  | after 3 days | 100 | 100 | 100 | 100 |
| Cohesive failure rate % adherend glass | Immediately after irradiation of UV ray | 100 | 100 | 100 | 100 |
|  | after 1 day | 100 | 100 | 100 | 100 |
|  | after 3 days | 100 | 100 | 100 | 100 |
| Cohesive failure rate % with polaizing plate | Untreated | 60 | 60 | 100 | 100 |
|  | Anti-reflection coat | 90 | 95 | 100 | 100 |
|  | Hard coat | 100 | 100 | 100 | 100 |
| Fogging | Under high temperature and high humidity | 0.34 | 0.38 | 0.46 | 0.44 |
| Color change at high temperature | Yellow Index | 0.41 | 0.43 | 0.43 | 0.41 |
| Coating property (wetting property with a part) |  | ○ | ○ | ○ | ○ |

In the table, *1 to *5 are the situation as follows.
*1: Fine cracks generated at 5 portions.
*2: Fine cracks generated at 1 portion.
*3: Cracks generated markedly.
*4: Fogging generated at whole surface.
*5: Fine crack generated at sealing portion and pealing generated at edge surface As shown in Examples 26 to 29 of Table 14, even when the metal halide lamp is used, it can be understood that the compositions of the present invention are excellent in the viewpoints of coating property, transmittance of the cured product, shrinkage ratio and elongation at the time of curing, temperature change with regard to the modulus of elasticity of the cured product and adhesiveness.

From the results in the above-mentioned Examples, the process for preparing an image display device using the specific ultraviolet-curable silicone resin composition of the present invention and the ultraviolet-curable silicone resin composition are excellent in coating ability, less cure shrinkage and can ensure legibility without causing color change and fogging in the respective durability tests as compared with the conventional ultraviolet-curable resin compositions, so that it can be understood that in a general small-sized image display device, it can ensure deformation resistance and legibility in adhesion of a thinner type image display portion than the conventional ones and a protective portion, and in particular, in a large-sized image display device, according to smooth coating of a resin, it is extremely suitable in the viewpoints of capable of ensuring deformation resistance and legibility, and can improve quality of adhesion between an image display portion and a protective portion and productivity.

Utilizability in Industry

According to the present invention, for producing a thin type or large-sized image display device in which a resin is interposed between a protective portion and an image display portion, it can be provided an ultraviolet-curable silicone resin composition which is a liquid state, excellent in coating property, and capable of realizing high brightness and high contrast display without causing display failure caused by deformation of the image display portion and without lowering legibility.

The invention claimed is:

1. An ultraviolet-curable silicone resin composition comprising
   (A) a polyorganosiloxane having a mercaptoalkyl group bonded to a silicon atom and a viscosity at 25° C. of 20 to 25000 cP;
   (B) an organopolysiloxane having aliphatic unsaturated groups which comprises
   (B1) a linear polyorganosiloxane having aliphatic unsaturated groups represented by the formula (I):

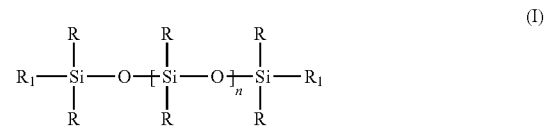

(I)

wherein
   each $R_1$ independently represents an aliphatic unsaturated group,
   each R independently represents a $C_1$-$C_6$ alkyl group or a $C_6$-$C_{12}$ group, and among Rs, 1 to 60 mol % is a $C_6$-$C_{12}$ aryl group,
   n is a number which results in a viscosity at 23° C. of 100 to 25000 cP, and
   (B2) a branched organopolysiloxane which comprises an $SiO_{4/2}$ unit, an $R'_3SiO_{1/2}$ unit and an $R'_2SiO_{2/2}$ unit, and optionally further comprises an $R'SiO_{3/2}$ unit, wherein each R' independently represents a $C_1$-$C_6$ alkyl group or an aliphatic unsaturated group, and at least three of R' per one molecule are aliphatic unsaturated groups, provided that an amount of (B2) is an amount where a number of the aliphatic unsaturated group in (B2) based on a total number of the aliphatic unsaturated groups in (B) is 50% or less;
   (C) a photoinitiator; and (D) one or more silane compounds containing an aliphatic unsaturated group selected from the group of 3-methacryloxypropyltriethoxysilane, 3-methacryloxypropyltrimethoxysilane, vinyltrimethoxysilane and vinyltriethoxysilane,
wherein
a ratio of a number of the mercaptoalkyl groups present in (A) based on a total number of the aliphatic unsaturated groups in (B) and (D) is 0.5 to 1.05,
a ratio of a number of the mercaptoalkyl groups present in (A) based on a number of the aliphatic unsaturated groups in (B) is 0.95 to 3, and
a ratio of a number of the mercaptoalkyl groups present in (A) based on a number of the aliphatic unsaturated groups in (D) is 1.5 to 3.

2. The ultraviolet-curable silicone resin composition according to claim 1, wherein an amount of (C) is 0.05 to 50 parts by weight based on 100 parts by weight of (B).

3. The ultraviolet-curable silicone resin composition according to claim 1, wherein the composition further comprises (E) one or more silicone resin series adhesion improvers selected from the group consisting of a MQ resin, a MDQ resin, a MT resin, a MDT resin, a MDTQ resin, a DQ resin, a DTQ resin and a TQ resin.

4. The ultraviolet-curable silicone resin composition according to claim 1, wherein visible light transmittance after curing is 95% or more.

5. The ultraviolet-curable silicone resin composition according to claim 1, wherein a cure shrinkage of the composition is 1.0% or less.

6. The ultraviolet-curable silicone resin composition according to claim 1, wherein an E hardness after curing of the composition is 5 to 40.

7. The ultraviolet-curable silicone resin composition according to claim 1, wherein a ratio (G'(T)/G'(23)) of a storage modulus G'(T) in the temperature range of −50° C. to 100° C. to a storage modulus G'(23) at 23° C. after curing of the composition is 0.1 to 30.

8. The ultraviolet-curable silicone resin composition according to claim 1, wherein a ratio (G"(T)/G"(23)) of a loss modulus G"(T) in the temperature range of −50° C. to 100° C. to a loss modulus G"(23) at 23° C. after curing of the composition is 0.1 to 300.

9. A sealing agent for an image display device comprising the ultraviolet-curable silicone resin composition according to claim 1.

10. An image display device comprising an image display portion and a protective portion being encapsulated by using the sealing agent for an image display device according to claim 9.

11. The ultraviolet-curable silicone resin composition according to claim 2, wherein the composition further comprises (E) one or more silicone resin series adhesion improvers selected from the group consisting of a MQ resin, a MDQ resin, a MT resin, a MDT resin, a MDTQ resin, a DQ resin, a DTQ resin and a TQ resin.

* * * * *